(12) United States Patent
Moriya et al.

(10) Patent No.: US 11,689,671 B2
(45) Date of Patent: Jun. 27, 2023

(54) DISPLAY DEVICE THAT ALLOWS USER TO EASILY MOVE ICON AND FREELY CHANGE ORDER OF ICON, IMAGE FORMING APPARATUS HAVING DISPLAY DEVICE, AND CONTROL METHOD FOR DISPLAY DEVICE

(71) Applicant: CANON KABUSHIKI KAISHA, Tokyo (JP)

(72) Inventors: Akihiro Moriya, Chiba (JP); Atsushi Ikeda, Ibaraki (JP); Hiroaki Koike, Tokyo (JP); Takeshi Kogure, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/508,465

(22) Filed: Oct. 22, 2021

(65) Prior Publication Data

US 2022/0159134 A1 May 19, 2022

(30) Foreign Application Priority Data

Nov. 16, 2020 (JP) .................. 2020-190219

(51) Int. Cl.
*H04N 1/00* (2006.01)
*G03G 15/00* (2006.01)
(Continued)

(52) U.S. Cl.
CPC ....... *H04N 1/00411* (2013.01); *G03G 15/502* (2013.01); *G06F 3/0483* (2013.01);
(Continued)

(58) Field of Classification Search
CPC .................................. H04N 1/00411
See application file for complete search history.

(56) References Cited

U.S. PATENT DOCUMENTS 8,854,659 B2 10/2014 Koike .......................... 358/1.15
9,032,481 B2 5/2015 Ikeda .............................. 726/3
(Continued)

FOREIGN PATENT DOCUMENTS

JP 2018-126979 8/2018

OTHER PUBLICATIONS

Extended European Search Report dated Apr. 11, 2022 in counterpart EP Application No. 21206669.0.
(Continued)

*Primary Examiner* — Roland J Casillas
(74) *Attorney, Agent, or Firm* — Venable LLP

(57) ABSTRACT

A display device that allows a user to easily move an icon across tabs and freely change the order of the icon in the tab of a movement destination is provided. The display device comprising a display unit, a touch panel that is arranged so as to superimposed on the display unit, and a control unit configured to display a screen including a plurality of tabs capable of accommodating a plurality of predetermined numbers of icons on the display unit. The control unit comprises a switching unit configured to switch between a home screen for displaying icons accommodated in a first tab selected via the touch panel among the plurality of tabs and a setting screen for moving a predetermined icon accommodated in the first tab to a second tab by a drag-and-drop operation, and a display control unit configured in such a way that when the predetermined icon is dragged onto a heading part of the second tab on the setting screen, in a case that there is no space for inserting the predetermined icon in the second tab, a display indicating that a drop operation is not possible is performed on the heading part of the second tab, and in a case that there is a space for inserting the predetermined icon in the second tab, a display indicat- (Continued)

ing that a drop operation is possible is performed on the heading part of the second tab.

12 Claims, 19 Drawing Sheets

(51) Int. Cl.
  *G06F 3/04817* (2022.01)
  *G06F 3/0483* (2013.01)
  *G06F 3/0486* (2013.01)
  *G06F 3/04883* (2022.01)

(52) U.S. Cl.
  CPC ........ *G06F 3/0486* (2013.01); *G06F 3/04817* (2013.01); *G06F 3/04883* (2013.01)

(56) References Cited

U.S. PATENT DOCUMENTS

| | | | | |
|---|---|---|---|---|
| 10,694,058 | B2 | 6/2020 | Kogure | H04N 1/00411 |
| 10,855,852 | B2 | 12/2020 | Koike et al. | H04N 1/00037 |
| 10,904,405 | B2 | 1/2021 | Ikeda et al. | H04N 1/32379 |
| 11,115,547 | B2 | 9/2021 | Kogure | H04N 1/00952 |
| 2010/0017732 | A1* | 1/2010 | Matsushima | G06F 3/0482 715/765 |
| 2011/0242024 | A1 | 10/2011 | Fukumoto et al. | 345/173 |
| 2014/0013254 | A1* | 1/2014 | Hosein | G06F 3/04883 715/765 |
| 2016/0188179 | A1* | 6/2016 | Roh | G06F 3/04845 715/769 |
| 2018/0136810 | A1* | 5/2018 | Martin | G06F 3/04845 |
| 2018/0232126 | A1 | 8/2018 | Kasamatsu | G06F 3/04817 |
| 2020/0096900 | A1 | 3/2020 | Moriya | G03G 15/0863 |
| 2020/0096928 | A1 | 3/2020 | Moriya | G03G 15/502 |
| 2020/0310714 | A1 | 10/2020 | Koike et al. | G06F 3/1288 |
| 2021/0081230 | A1 | 3/2021 | Kogure et al. | G06F 3/1253 |
| 2021/0152709 | A1 | 5/2021 | Ikeda et al. | G06F 21/608 |
| 2021/0258438 | A1 | 8/2021 | Ikeda et al. | G06F 3/04817 |

OTHER PUBLICATIONS

Dan Frakes: "Hands on with iOS 4 folders", Jun. 21, 2010 (Jun. 21, 2010), pp. 1-8, Retrieved from the Internet: URL: http://www.macworld.com/article/1152168/ios4folders.html.

Friedman Lex: "iOS 4 folders: Usable, but poorly implemented", Jun. 22, 2010 (Jun. 22, 2010), pp. 1-9, Macworld, Retrieved from the Internet: URL: https://www.macworld.com/article/206145/ios4_folders.html.

Zollotech: "iPhone 4 / 4S Tips—Apps, Folders and Multitasking", Jan. 3, 2012 (Jan. 3, 2012), Retrieved from the Internet: URL: https://www.youtube.com/watch?v=ydsqeAcTAoY.

Mathis Joel: "New Samsung printers print directly from iOS devices", Aug. 24, 2011 (Aug. 24, 2011), pp. 1-1, Retrieved from the Internet: URL: https://www.macworld.com/article/213982/new_samsung_printers_print_directly_from_ios_devices.html.

Wolfgang: "Samsung ML-2955DW Test Drucker", Oct. 20, 2011 (Oct. 20, 2011), pp. 1-3, https://www.testberichte.de/p/samsung-tests/ml-2955dw-testbericht.html, Retrieved from the Internet: URL: https://web.archive.org/web/20111106182253/http://www.testberichte.de:80/p/samsung-tests/ml-2955dw-testbericht.html, with English translation.

Bulygin Daniel: "How to Add Folders & Tabs to Your Android App Drawer Menu", Feb. 23, 2015 (Feb. 23, 2015), pp. 1-5, https://trendblog.net/folders-and-tabs-android-app-drawer-menu/, Retrieved from the Internet: URL: https://web.archive.org/web/20171129114202/https://trendblog.net/folders-and-tabs-android-app-drawer-menu/.

* cited by examiner

DISPLAY DEVICE THAT ALLOWS USER TO EASILY MOVE ICON AND FREELY CHANGE ORDER OF ICON, IMAGE FORMING APPARATUS HAVING DISPLAY DEVICE, AND CONTROL METHOD FOR DISPLAY DEVICE

BACKGROUND OF THE INVENTION

Field of the Invention

The present invention relates to a display device, an image forming apparatus having the display device, and a control method for the display device.

Description of the Related Art

In an electronic apparatus such as a smartphone, a technique that shifts to an icon editing mode by performing a long tap operation on an icon displayed on a screen with a finger or the like and changes a display position of the icon, on which the long tap operation is performed, by performing a drag-and-drop operation is widely used. On the other hand, as a file browsing application used in a computer or the like, a technique, which displays folders in tabs and moves a file across the folders by dragging and dropping an icon of the file, is known. Further, in Japanese Laid-Open Patent Publication (kokai) No. 2018-126979, a method, which displays operation screens of an image forming apparatus in tabs, groups pages and switches between them, has been proposed.

However, in the file browsing application described above, although the icon can be moved across the folders by the drag-and-drop operation, it is not possible to arrange the moved file in an arbitrary order within the folder or tab of a movement destination.

On the other hand, in the technique disclosed in the above Japanese Laid-Open Patent Publication (kokai) No. 2018-126979, for rearrangement of the icons and the movement between tabs, a method is adopted, in which an icon to be move is selected in advance and a button for moving the selected icon to the left, the right, or any tab is pressed. Also, the movement of the icon between the tabs by the drag-and-drop operation is not disclosed.

SUMMARY OF THE INVENTION

The present invention provides a display device that allows a user to easily move an icon across tabs and freely change the order of the icon in the tab of a movement destination, an image forming apparatus having the display device, and a control method for the display device.

Accordingly, the present invention provides a display device comprising a display unit, a touch panel that is arranged so as to superimposed on the display unit, and a control unit configured to display a screen including a plurality of tabs capable of accommodating a plurality of predetermined numbers of icons on the display unit, and wherein the control unit comprises a switching unit configured to switch between a home screen for displaying icons accommodated in a first tab selected via the touch panel among the plurality of tabs and a setting screen for moving a predetermined icon accommodated in the first tab to a second tab by a drag-and-drop operation, and a display control unit configured in such a way that when the predetermined icon is dragged onto a heading part of the second tab on the setting screen, in a case that there is no space for inserting the predetermined icon in the second tab, a display indicating that a drop operation is not possible is performed on the heading part of the second tab, and in a case that there is a space for inserting the predetermined icon in the second tab, a display indicating that a drop operation is possible is performed on the heading part of the second tab.

According to the display device of the present invention, it is possible for the user to easily move the icon across the tabs and freely change the order of the icon in the tab of the movement destination.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Here, an image forming apparatus having a display device according to the present invention (hereinafter referred to as "MFP") will be taken up, but the present invention is not limited to the MFP, and can be applied to various electronic apparatuses that have a display device.

Figure 1:
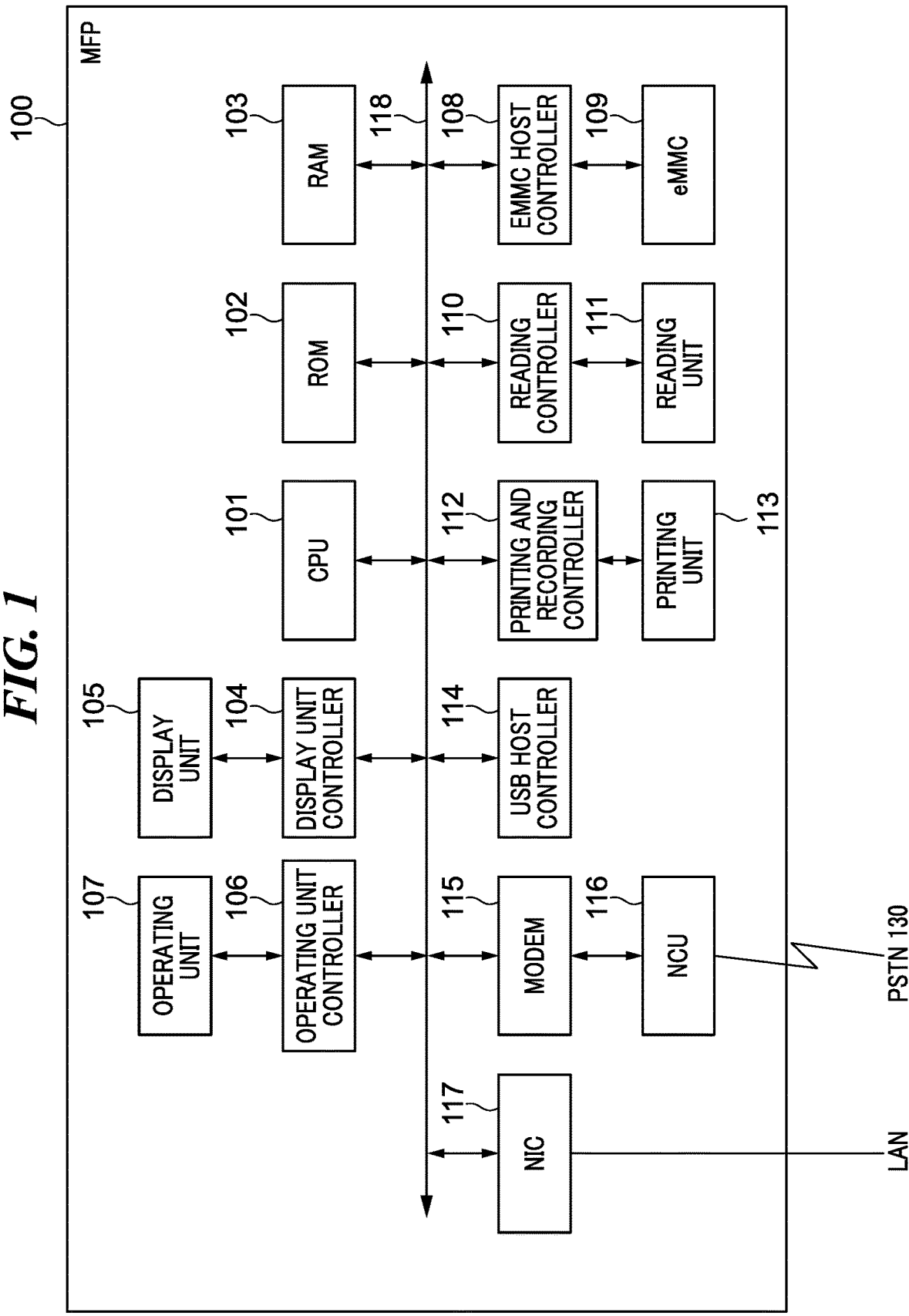
FIG. 1 is a block diagram that shows a hardware configuration of an MFP according to an embodiment of the present invention.

FIG. 1 is a block diagram that shows a hardware configuration of an MFP (multifunction peripheral) 10 according to an embodiment of the present invention. As shown in FIG. 1, the MFP 10 has a CPU (Central Processing Unit) 101, a ROM (Read Only Memory) 102, a RAM (Random Access Memory) 103, a display unit controller 104, a display unit 105, an operating unit controller 106, and an operating unit 107. Further, the MFP 10 has an eMMC (embedded Multi Media Card) host controller 108, an eMMC 109, a reading controller 110, a reading unit 111, a printing and recording controller 112, and a printing unit 113. Furthermore, the MFP 10 has a USB (Universal Serial Bus) host controller 114, a modem 115, a network control unit (NCU) 116, a network interface card (NIC) 117, and a system bus 118.

The CPU 101 comprehensively controls each device connected to the system bus 118. When electric power is supplied, the CPU 101 executes a boot program stored in the ROM 102. Usually, the boot program loads a main program stored in a storage (a storage means) such as the ROM 102 into the RAM 103, and jumps to the beginning of the loaded main program. The RAM 103 functions not only as a load location for the main program but also as a working area for the main program, etc. Various control programs executed by the CPU 101 and the contents of display control of the display unit 105 by executing a predetermined control program will be described later.

The display unit controller 104 controls drawing on the display unit 105. The display unit 105 is, for example, a WVGA (Wide Video Graphics Array) size full bitmap LCD (Liquid Crystal Display). The operating unit controller 106 controls an input from the operating unit 107 that is equipped in the MFP 10. The operating unit 107 includes various operation buttons and a touch panel that is superimposed on the display unit 105. The display control of the display unit 105, which will be described later, is executed in response to an operation on the touch panel.

The reading unit 111 performs reading of a document. Further, the reading unit 111 is equipped with an auto document feeder (ADF) (not shown), and the reading unit 111 is configured to be capable of automatically and sequentially reading a plurality of documents by the ADF. The reading unit 111 is connected to the reading controller 110, and the CPU 101 communicates with the reading unit 111 via the reading controller 110.

The printing unit 113 forms an image on a recording paper sheet by using an electrophotographic method. The printing unit 113 is connected to the printing and recording controller 112, and the CPU 101 communicates with the printing unit 113 via the printing and recording controller 112. The USB host controller 114 is in charge of protocol control of USB, and intermediates access to a USB device such as a USB memory (not shown).

The modem 115 performs modulating and demodulating of signals that are necessary for facsimile communication. The modem 115 is connected to the NCU 116, and the signal modulated by the modem 115 is transmitted to a public switched telephone network (PSTN) 130 via the NCU 116. The NIC 117 performs bidirectional data communications with a mail server, a file server, a Web server, etc. via a LAN (Local Area Network). The eMMC 109 is one of storages, and the CPU 101 accesses to the eMMC 109 via the eMMC host controller 108.

Figure 2:
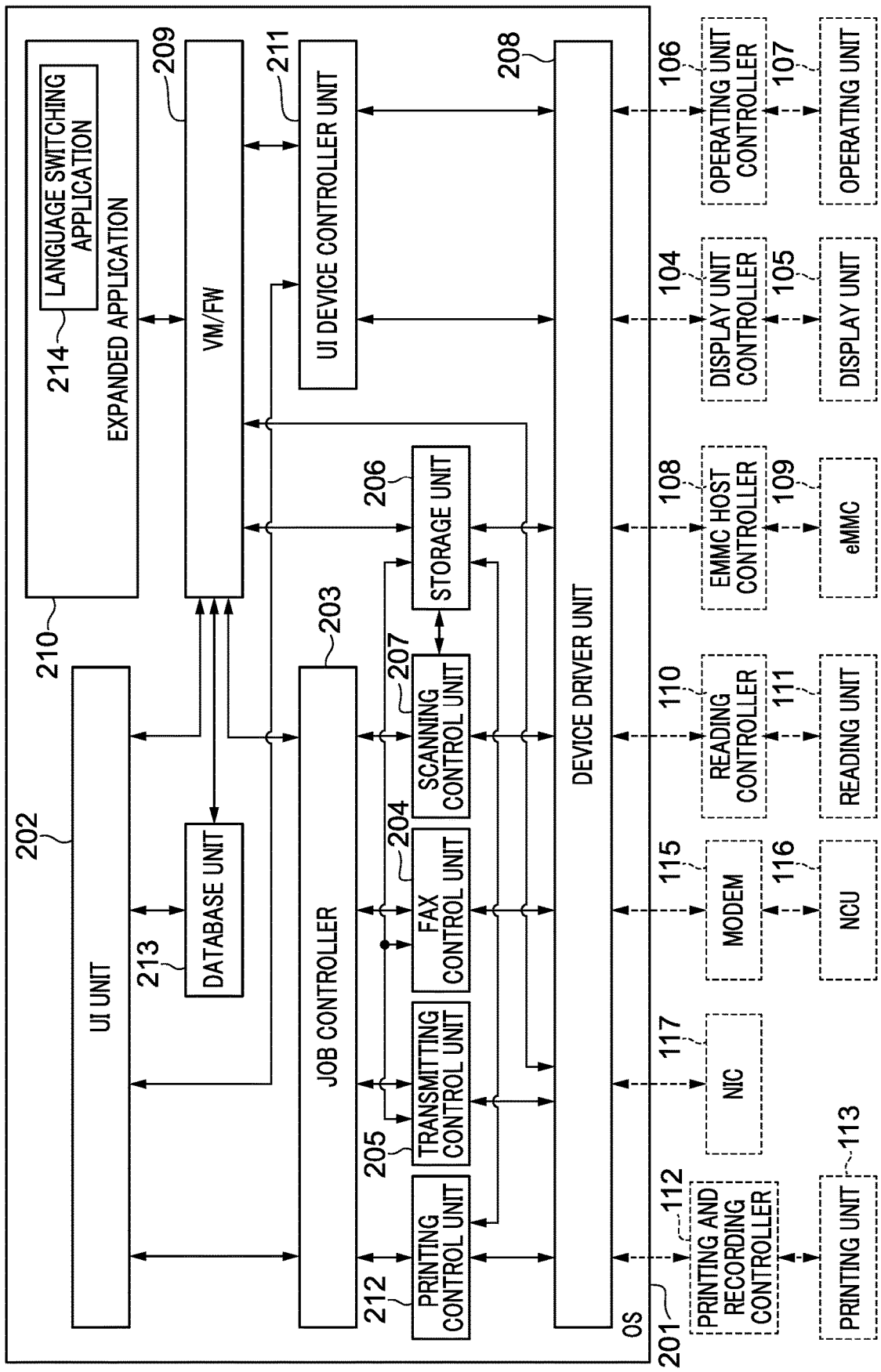
FIG. 2 is a block diagram that shows a software configuration of the MFP.

FIG. 2 is a block diagram that shows a software configuration of the MFP 10. In FIG. 2, each unit, which is indicated by a solid line, is a software module realized by the CPU 101 executing the main program, which is loaded into the RAM 103 by the boot program.

The execution of each module by the main program is managed and controlled by an operating system (OS) 201. A device driver unit 208 is combined with the OS 201. The device driver unit 208 intermediates communications with hardware devices such as the display unit controller 104, the operating unit controller 106, and the reading controller 110. A user interface (UI) unit 202 provides various kinds of information to a user via the display unit 105 and the operating unit 107, and receives various instructions from the user. Various settings related to operations of the MFP 10 can also be changed through the UI unit 202. The various settings changed by the UI unit 202 are stored in the eMMC 109 via a database unit 213. Further, one of the various settings of the MFP 10 is a display language setting, and the display language setting can be changed by the UI unit 202.

A job controller 203 accepts a job such as copy, print, or facsimile transmission/reception, and controls the execution of the accepted job. A storage unit 206 is a software module, which stores data such as images for facsimile transmission/reception, application settings requested from an expanded application 210, etc. in the eMMC 109 and manages the stored data. For example, in the MFP 10, when the job controller 203 accepts a fax transmission job, in response to this job request, the scan control unit 207 controls the reading unit 111 to scan the document, and the obtained facsimile image data is stored in the storage unit 206. The facsimile image data stored in the storage unit 206 is read out by a fax control unit 204 and then is facsimile-transmitted to the other party (a destination) via the modem 115 and the NCU 116. On the other hand, image data, which is facsimile-received from the outside via the NCU 116 and the modem 115, is taken in by the fax control unit 204 and is stored in the storage unit 206.

The MFP 10 has a VM (Virtual Machine)/FW (Framework) unit 209. The expanded application 210 is configured by an arbitrary program or the like written in a script language, and for example, is configured by using a language system such as Java (registered trademark), which is an interpreter that interprets and executes bytecodes, or Lua. The VM/FW unit 209 installs the arbitrary program, which is written in the script language or a predetermined high-level language, into the expanded application 210, and uninstalls it from the expanded application 210. Further, the VM/FW unit 209 is in charge of intermediating between a function realized by the arbitrary program installed in the expanded application 210 and existing functions, etc. And then, the VM/FW unit 209 interprets and executes the described script language. As a result, the MFP 10 can easily realize an arbitrary function such as a language switching application 214 while maintaining the attachability and detachability of the function. Further, in response to a request from the arbitrary program installed in the expanded application 210, the VM/FW unit 209 refers to or changes various setting values stored in the database unit 213. Moreover, in the MFP 10, the expanded application 210 is optional.

A UI device controller unit 211 intermediates a processing, in which the UI unit 202 and the expanded application 210 output various kinds of information to the display unit 105. Further, the UI device controller unit 211 intermediates a processing of transmitting a signal generated by the user operating the operating unit 107 to the UI unit 202 and the expanded application 210. A transmitting control unit 205 performs, for example, a processing of transmitting the facsimile image data or the like taken in by the storage unit 206 by means of the fax control unit 204 to the outside via the NIC 117. A printing control unit 212 performs a processing for printing the image data or the like, which is read by the reading unit 111 and is stored in the storage unit 206, by means of the printing unit 113 via the printing and recording controller 112.

Figure 3A:
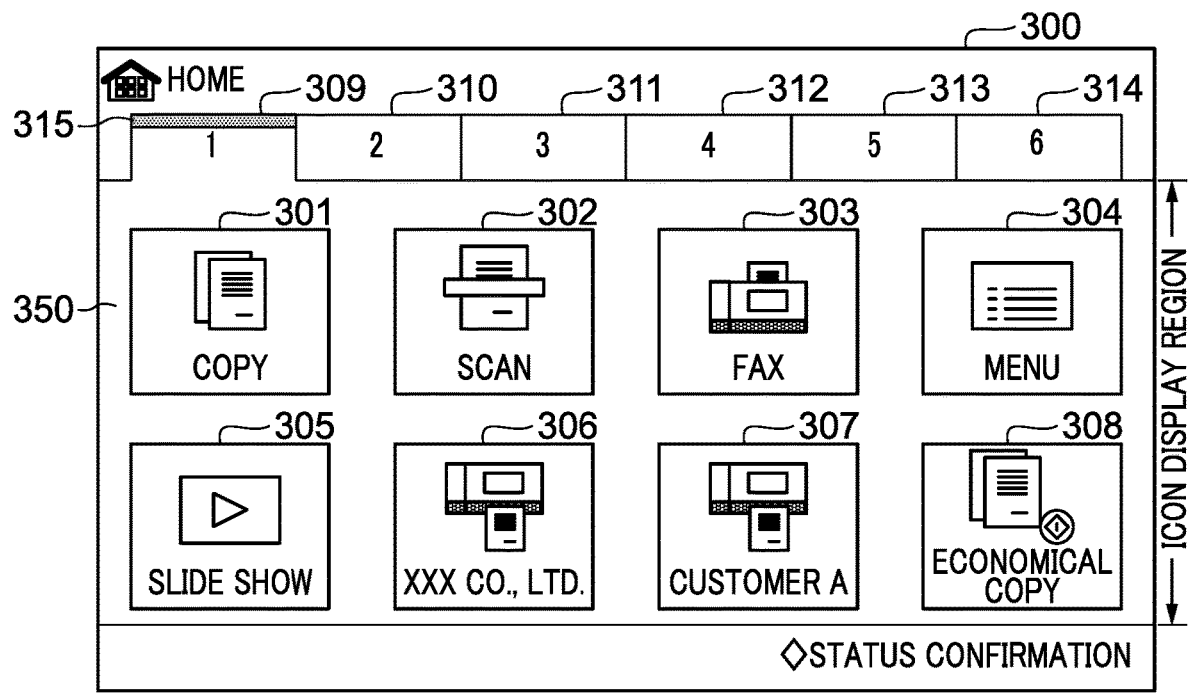
FIGS. 3A and 3B are figures that show one example of a home screen according to a first embodiment of the MFP.
Figure 3B:
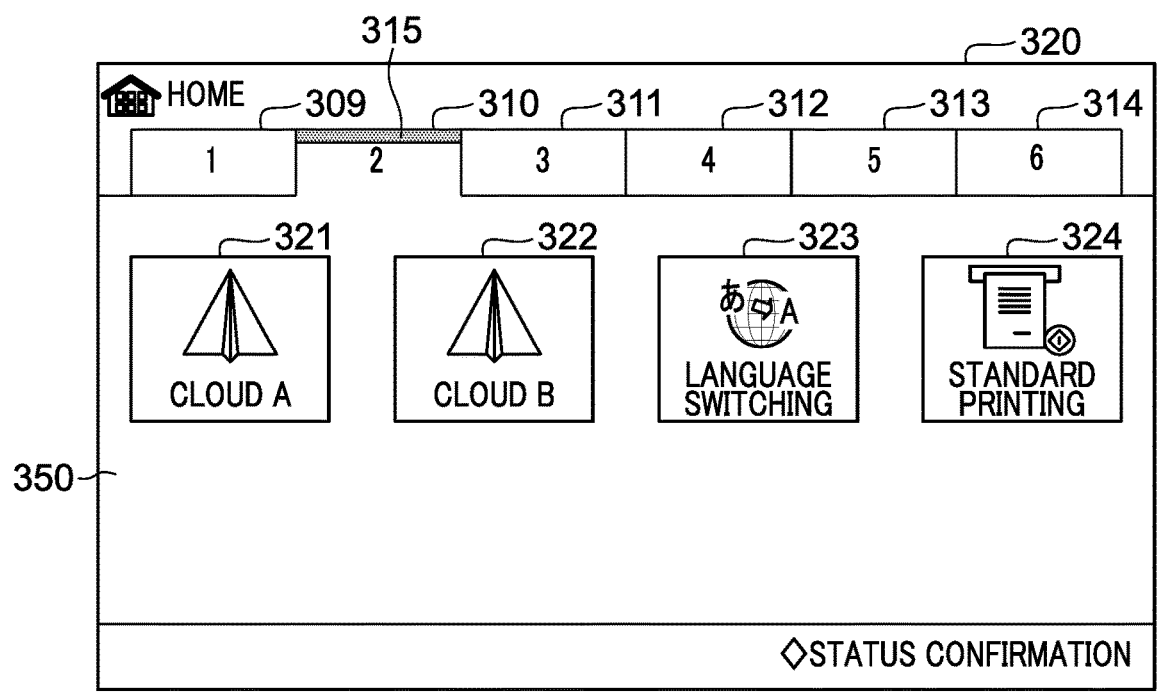

FIGS. 3A and 3B are figures that show one example of a home screen according to a first embodiment of the MFP 10. The home screen is generated by the CPU 101 executing a program constituting the UI unit 202, and is displayed on the display unit 105 via the UI device controller unit 211.

Here, the home screen is composed of six tabs (tabs 1 to 6), and the tabs 1 to 6 have heading parts 309 to 314. The home screen is provided with an icon display region 350 for displaying icons that are accommodated in the selected tab.

FIG. 3A shows a home screen 300 in the case that the tab 1 is selected, and FIG. 3B shows a home screen 320 in the case that the tab 2 is selected. Eight icons (icons 301 to 308) are accommodated in the tab 1, and four icons (icons 321 to 324) are accommodated in the tab 2. On the home screen, in order to inform the user that which of the six tabs is currently displayed, a tab selection mark 315 is added to the heading part of the displayed tab.

Figure 4:
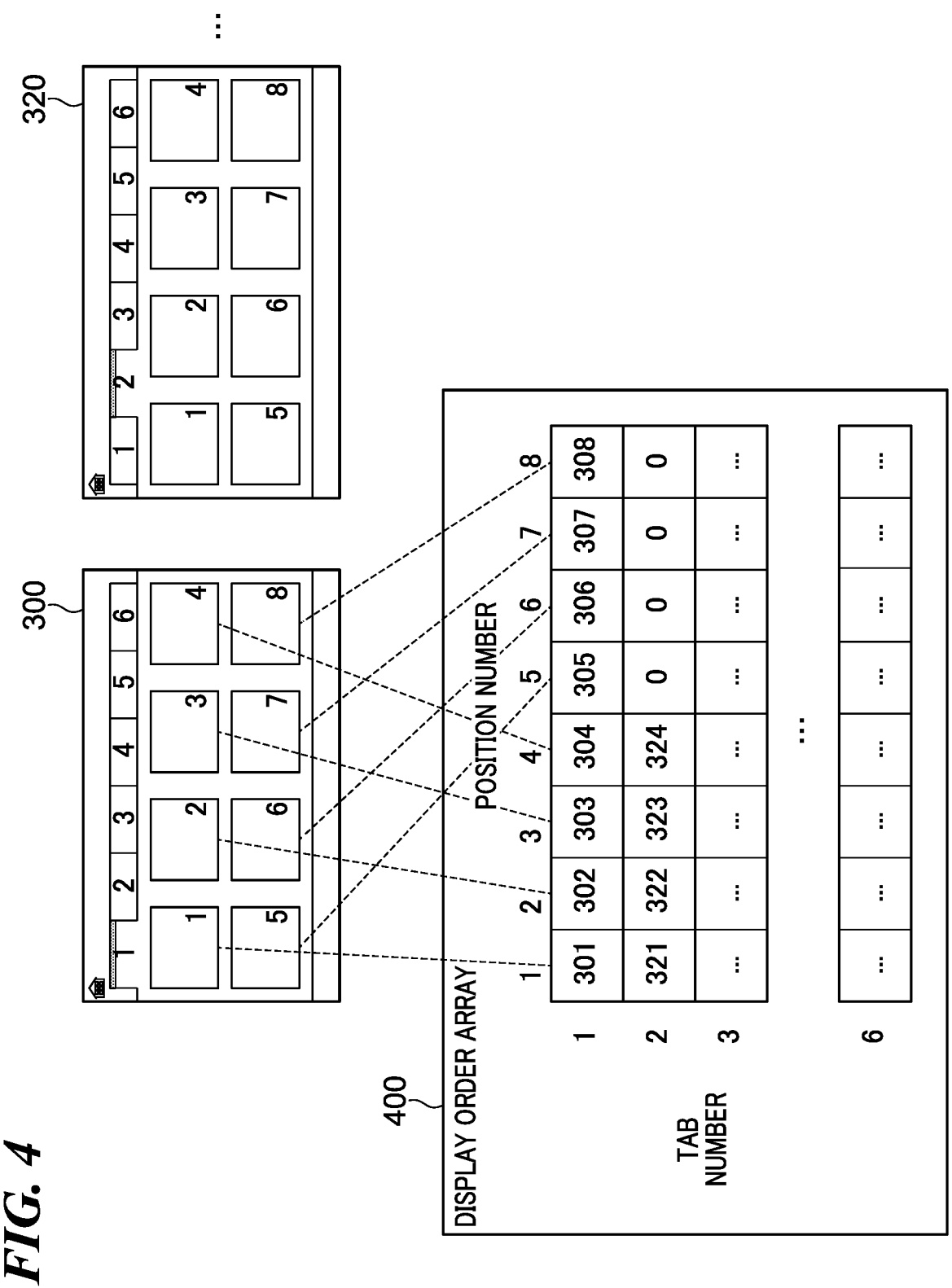
FIG. 4 is a figure for explaining a structure of data that manages an icon display order of the home screen.

FIG. 4 is a figure for explaining a structure of data that manages an icon display order of the home screen of the MFP 10. In the MFP 10, the display order of each icon on the home screen is managed by a display order array 400, which is a two-dimensional array composed of a tab number and a position number. The display order array 400 is stored in the eMMC 109 via the database unit 213.

The upper part of FIG. 4 simply shows the home screen 300 of FIG. 3A and the home screen 320 of FIG. 3B. Array information of the icon arranged at a position 1 of the upper part of the tab 1 is retained as an array [1] [1] by using a tab number 1 and a position number 1. Therefore, the array information of the four icons arranged at the upper part of the tab 1 is retained as arrays [1] [1], [1] [2], [1] [3], [1] [4], respectively.

Further, the array information of the four icons arranged at regions 5 to 8 of the lower part of the tab 1 is retained as arrays [1] [5], [1] [6], [1] [7], [1] [8], respectively. Similarly, the array information of the four icons arranged at regions 1 to 4 of the upper part of the tab 2 and the four icons arranged at regions 5 to 8 of the lower part of the tab 2 is retained as arrays [2] [1] to [2] [8], and an icon number of the icons arranged at the other tabs is also retained in the same way. In this way, the MFP 10 is configured to be capable of accommodating up to eight icons in one tab.

FIG. 4 shows an example that the eight icons (the icons 301 to 308) accommodated in the tab 1 shown in FIG. 3A and the four icons (the icons 321 to 324) accommodated in the tab 2 shown in FIG. 3B are retained in the display order array 400. '0' stored in the arrays [2] [5] to [2] [8] of the display order array 400 means that the icon does not exist, that is, a blank on the home screen.

In the MFP 10, as a general rule, it is controlled so that the blank is not arranged between the icons in each tab. That is, in the arrays [i] [j] (i; 1 to 6, j; 1 to 8), '0' indicating the blank is retained so as to continue in the range of the arrays [i] [j] to [i] [8]. Further, for convenience, although the icon number of the icons shown in FIG. 4 uses the reference numeral assigned to each icon shown in FIGS. 3A and 3B, different values may be used as long as the individual icons can be identified.

Figure 5:
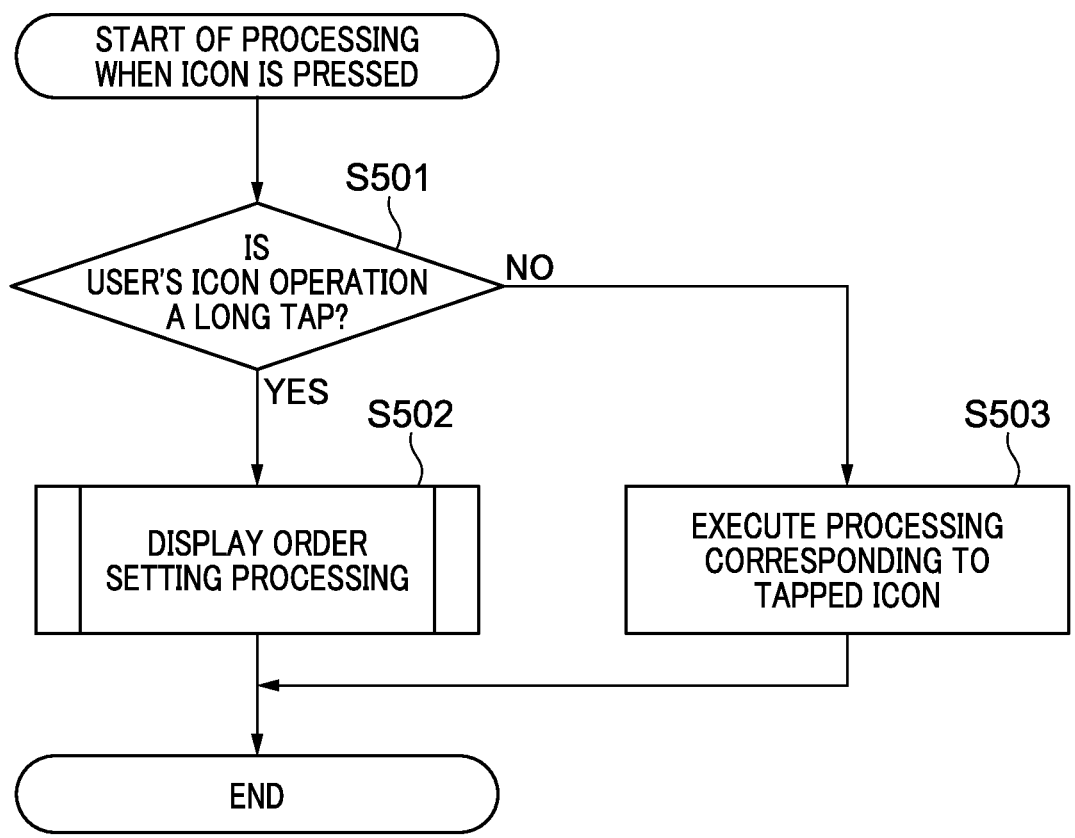
FIG. 5 is a flowchart that shows a processing when an icon displayed on the home screen is pressed.

FIG. 5 is a flowchart that shows a processing when an icon displayed on the home screen is pressed. Each processing, which is indicated by a S number (a step number) in the flowchart of FIG. 5, is executed by the CPU 101 executing a part of the program constituting the UI unit 202 to control the operation of each unit of the MFP 10.

When the user operates the operating unit 107, operating information, which indicates operating contents, etc. such as a coordinate position on the screen, tap-in, tap-out, long tap (pressing-and-holding), flick, drag, is notified from the operating unit 107 to the UI unit 202 via the UI device controller unit 211. In the case that the operating information notified from the operating unit 107 is an operation on the icon display region 350, the UI unit 202 calls the processing of the flowchart of FIG. 5.

In a step S501, the CPU 101 judges whether or not the operation of the icon by the user in the operating information notified to the UI unit 202 is a long tap. In the case that the CPU 101 judges that the operation of the icon by the user is a long tap (YES in the step S501), the processing proceeds to a step S502, and in the case that the CPU 101 judges that the operation of the icon by the user is not a long tap (NO in the step S501), the processing proceeds to a step S503. Further, a typical example of an operation, which is not a long tap, is a tap operation consisting of simple tap-in and tap-out (hereinafter referred to as "a usual tap operation").

In the step S502, the CPU 101 performs a display order setting processing, and then ends the processing of FIG. 5. That is, even in the case that the long tap, which is a judging target of the step S501, is a long tap on the icon, the CPU 101 does not detect as an operation that executes processing related to the long-tapped icon, but detects as an operation to shift to the display order setting processing. In other words, in order to perform transition from the home screen to the screen for performing the display order setting processing, just need to perform a long tap operation on any icon displayed on the icon display region 350.

As described above, in the present embodiment, in the step S501, the CPU 101 judges whether or not the operation on the icon is a long tap. However, the present invention is not limited to this, and the present invention may be configured that in the case that the operation on the icon is a long tap on the icon display region 350, a setting screen of the display order of the tabs is displayed even if the tap operation is not necessarily on the icon. In this case, in the case of a tap operation other than a long tap to the region between the icons in the icon display region 350, the processing of the step S503 will not be performed, and the processing is returned to the step S501. The details of the processing of the step S502 will be described later.

In the step S503, the CPU 101 executes a processing corresponding to the tapped icon (for example, a copy processing in the case that the icon 301 of FIG. 3A is tapped), and then ends the processing of FIG. 5. Since the predetermined processing executed in the step S503 (that is, the processing corresponding to the tapped icon) is not directly related to the characteristic configuration of the present invention, the description thereof will be omitted.

Figure 6:
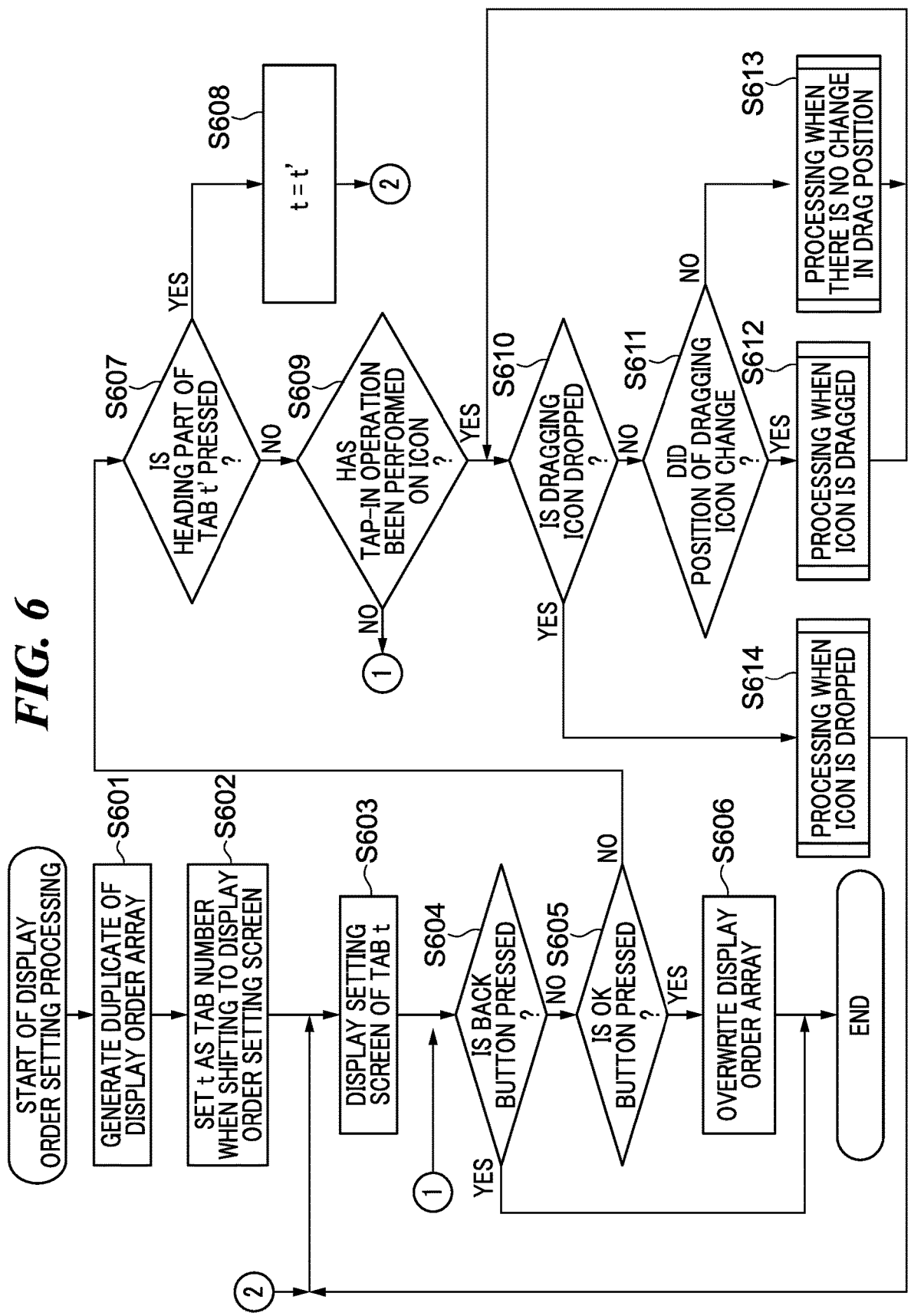
FIG. 6 is a flowchart of a display order setting processing of a step S502.

FIG. 6 is a flowchart of the display order setting processing of the step S502. Each processing, which is indicated by the S number in the flowchart of FIG. 6, is executed by the CPU 101 executing a part of the program constituting the UI unit 202 to control the operation of each unit of the MFP 10.

In a step S601, the CPU 101 internally generates a duplicate of the display order array 400 (see FIG. 4). In a step S602, the CPU 101 sets the tab number of the tab having the icon judged to have been long-tapped in the step S501 to 't'. In a step S603, the CPU 101 displays a display order setting screen in a state that the tab having the tab number t is selected (displayed).

Figure 7:
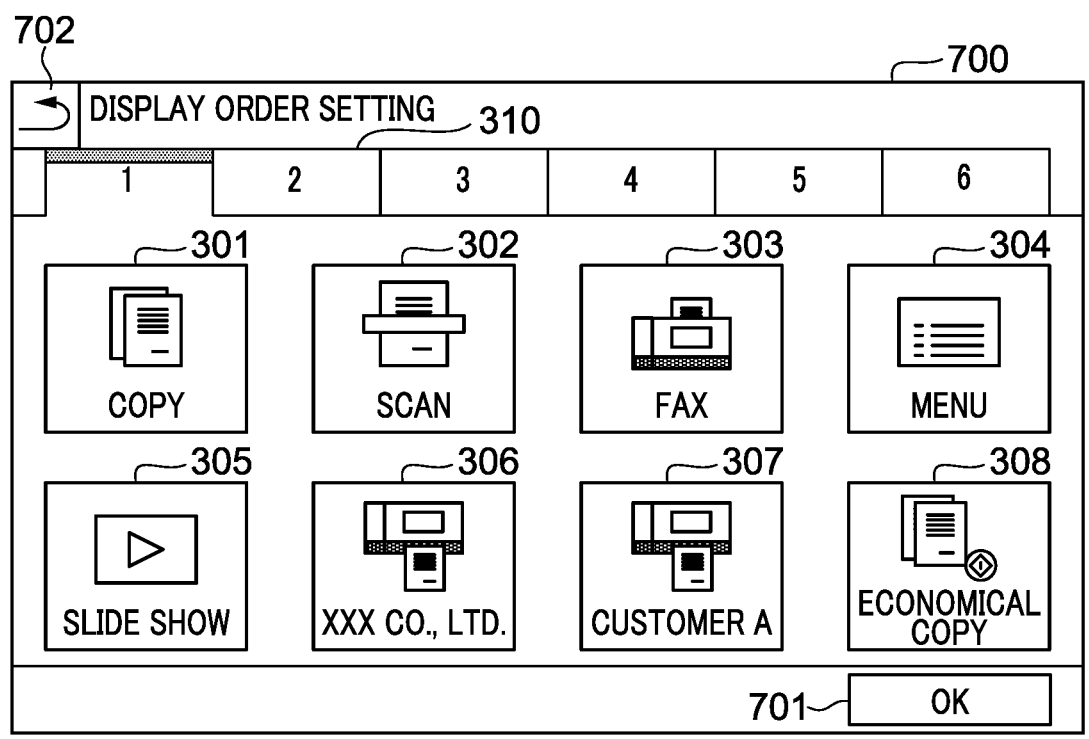
FIG. 7 is a figure that shows one example of a display order setting screen of an icon displayed in a step S603.

FIG. 7 is a figure that shows one example of a display order setting screen 700 of the tab displayed on the display unit 105 in the step S603. The setting screen 700 is a display example in the case that t=1, that is, the tab 1 shown in FIG. 3A is selected. The setting screen 700 includes an OK button 701 and a back button 702.

In a step S604, the CPU 101 judges whether or not the back button 702 has been pressed. Specifically, the judging of the step S604 is performed by whether or not it is the usual tap operation with respect to the coordinate position of the back button 702. In the case that the CPU 101 judges that the back button 702 has been pressed (YES in the step S604), the CPU 101 ends the display order setting processing without performing any processing, and in the case that the CPU 101 judges that the back button 702 has not been pressed (NO in the step S604), the processing proceeds to a step S605. Further, in the case that the CPU 101 judges that the back button 702 has been pressed, the display order setting screen is switched to the home screen. For example, when the back button 702 is pressed on the setting screen 700, the setting screen 700 is switched to the home screen 300.

In the step S605, the CPU 101 judges whether or not the OK button 701 has been pressed based on whether or not the usual tap operation on the OK button 701 has been performed. In the case that the CPU 101 judges that the OK button 701 has been pressed (YES in the step S605), the processing proceeds to a step S606. In the step S606, the CPU 101 writes back the duplicate of the latest display order array to the original display order array 400, and then, the CPU 101 ends the display order setting processing. As a result, the change work of the icon display order performed up to that time point is reflected in the display order array 400. Further, in the case that the CPU 101 judges that the OK button 701 has been pressed, the display order setting screen is switched to the home screen.

In the step S605, in the case that the CPU 101 judges that the OK button 701 has not been pressed (NO in the step S605), the processing proceeds to a step S607. In the step S607, the CPU 101 judges whether or not the heading part of a tab t' different from the currently displayed tab t has been pressed. The judging of the step S607 corresponds to a processing of judging whether or not a processing of finding out that the icon that the user wants to move its display position (its accommodation location) is currently in which tab, has been performed. In the case that the CPU 101 judges that the heading part of the tab t' has been pressed (YES in the step S607), the processing proceeds to a step S608. In the step S608, the CPU 101 sets the value of t' in t, and then returns the processing to the step S603. As a result, the tab selection mark 315 moves to the pressed tab t', and a screen that includes the icons accommodated in the tab t' is displayed.

In the case that the CPU 101 judges that the heading part of the tab t' has not been pressed (NO in the step S607), the processing proceeds to a step S609. In the step S609, the CPU 101 judges whether or not a tap-in operation on the icon has been performed. In the case that the CPU 101 judges that the tap-in operation on the icon has not been performed (NO in the step S609), the processing returns to the step S604, and in the case that the CPU 101 judges that the tap-in operation on the icon has been performed (YES in the step S609), the processing proceeds to a step S610.

In the step S610, the CPU 101 judges whether or not the icon being dragged after the tap-in operation in the step S609 (hereinafter referred to as "a dragging icon") has been dropped. Further, the display order setting screen is a screen displayed on the assumption that moving of the displayed icon is performed. Therefore, in the case that the icon, on which the tap-in operation has been performed on the display order setting screen, is not dragged (for example, in the case that the usual tap operation is performed on the displayed icon), no processing is performed, and the display order setting screen is also unchanged.

In the step S610, in the case that the CPU 101 judges that the dragging icon has not been dropped (NO in the step S610), the processing proceeds to a step S611. In the step S611, the CPU 101 judges whether or not a position of the dragging icon (hereinafter also referred to as "a drag position") has changed (moved). In the case that the CPU 101 judges that the position of the dragging icon has changed (YES in the step S611), the processing proceeds to a step S612, and in the case that the CPU 101 judges that the position of the dragging icon has not changed (NO in the step S611), the processing proceeds to a step S613.

In the step S612, the CPU 101 executes a processing when the icon is dragged, and then returns the processing to the step S610. On the other hand, in the step S613, the CPU 101 executes a processing when there is no change in the drag position, and then returns the processing to the step S610. Further, the details of the processing of the step S612 and the processing of the step S613 will be described later.

In the case that the CPU 101 judges that the dragging icon has been dropped (i.e., a tap-out operation on the dragging icon has been performed) (YES in the step S610), the processing proceeds to a step S614. In the step S614, the CPU 101 executes a processing when the icon is dropped, and then returns the processing to the step S603. Further, the details of the processing of the step S614 will be described later.

Figure 8:
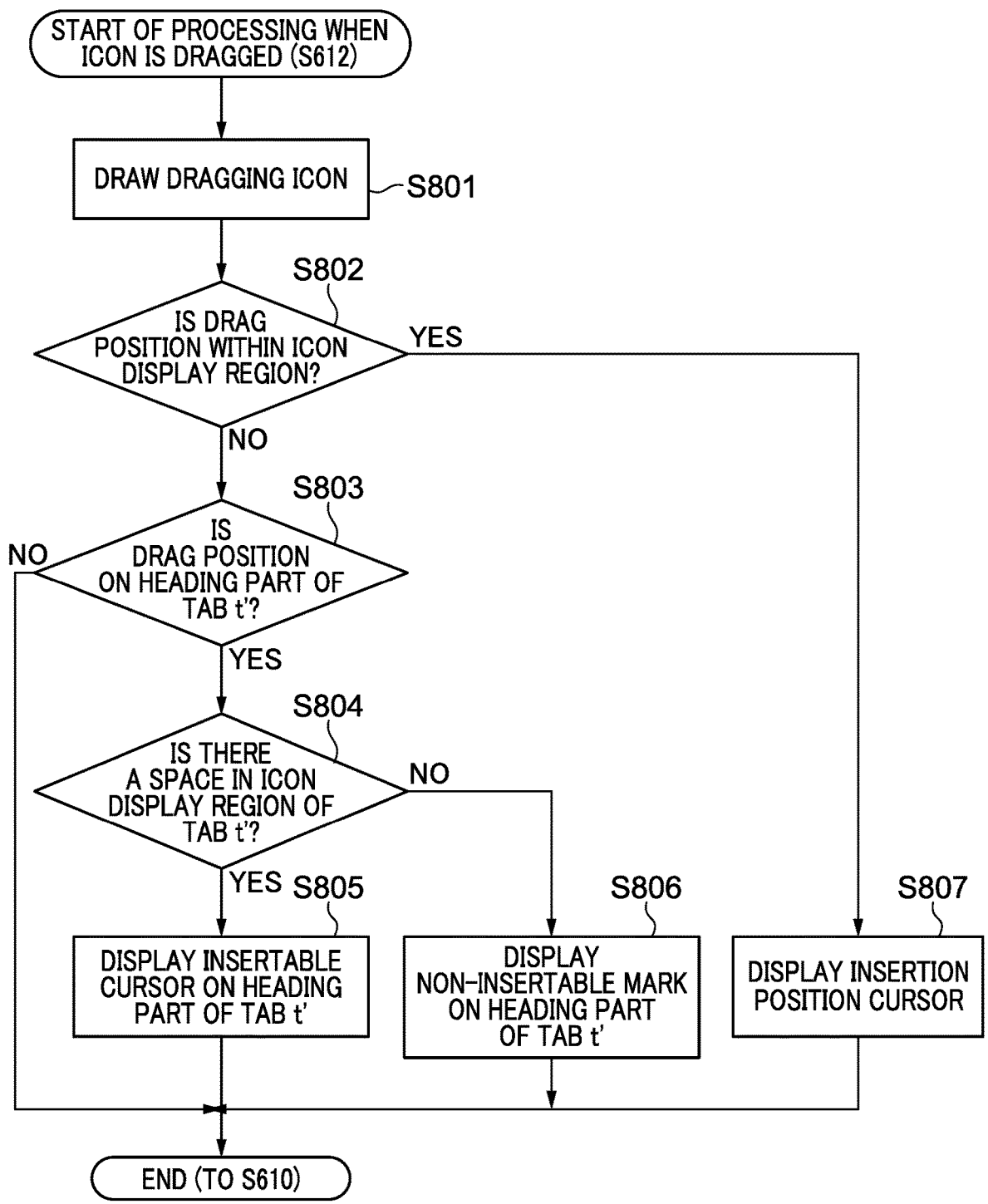
FIG. 8 is a flowchart of a processing of a step S612.

Next, the processing of the step S612, the processing of the step S613 and the processing of the step S614 will be described. At first, the processing of the step S612 will be described. FIG. 8 is a flowchart of the processing when the icon is dragged of the step S612. Each processing, which is indicated by the S number in the flowchart of FIG. 8, is executed by the CPU 101 executing a part of the program constituting the UI unit 202 to control the operation of each unit of the MFP 10.

Figure 9A:
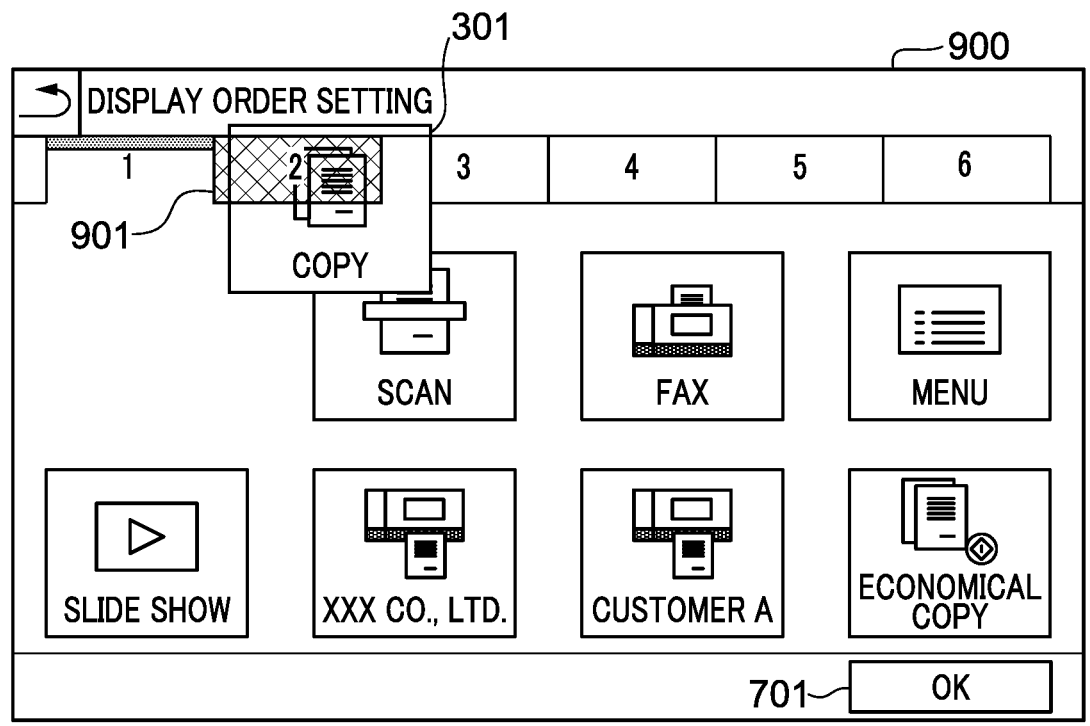
FIGS. 9A and 9B are figures that show a display example of a dragging icon on the display order setting screen.

In a step S801, the CPU 101 displays the dragging icon on the display order setting screen. Specifically, the image of the dragging icon at a previous (before moving) drawing position is erased with a background image, and the same icon image is drawn at a new (after moving) position. FIG. 9A is a figure that shows a display example of the dragging icon in the step S801. FIG. 9A shows a display order setting screen 900, which is one example of a state that the icon 301 is dragged onto the tab 2 after the tap-in operation on the icon 301 has been performed on the display order setting screen 700. Further, as will be described later, the setting screen 900 shows a state that an insertable cursor 901 is displayed on the heading part of the tab t' in a step S805 after further passing through steps S802 to S804. Although FIG. 9A shows an example that displays the insertable cursor 901 by superimposing a shaded pattern on a heading part 310 of the tab 2, the present invention is not limited to this, and other patterns may be used as long as the heading part 310 can be distinguished from heading parts of other tabs.

In the step S802, the CPU 101 judges whether or not the position of the dragging icon (the drag position) is within the icon display region 350 of the tab t. Further, in the case that the processing of the step S612 is performed after the processing of the step S613, the tab tin this case becomes a tab different from the tab, in which the dragging icon is originally accommodated, due to the processing of the step S613 (steps S1103 to S1104). In the case that the CPU 101 judges that the position of the dragging icon is out of the icon display region 350 (NO in the step S802), the processing proceeds to the step S803.

In the step S803, the CPU 101 judges whether or not the drag position of the dragging icon is on the heading part of the tab t'. That is, it is judged whether or not the dragging icon is dragged on the heading part of the tab different from the original tab, in which the dragging icon is accommodated. In the case that the CPU 101 judges that the dragging icon is not on the heading part of the tab t' (NO in the step S803), the CPU 101 ends the processing of the step S612, as a result, the processing is returned from the step S612 to the step S610. Further, the case that the judging of the step S803 is NO is a case that the dragging icon is at the drag position where a processing for changing the display position cannot be performed (a case that the drag position is inappropriate).

In the step S803, in the case that the CPU 101 judges that the dragging icon is on the heading part of the tab t' (YES in the step S803), the processing proceeds to the step S804. In the step S804, the CPU 101 judges whether or not there is a space capable of inserting (accommodating) the icon in the icon display region 350 of the tab t'. In other words, the processing of the step S803 is a processing of judging whether or not the number of icons accommodated in the icon display region 350 of the tab t' is seven or less. In the case that the CPU 101 judges that there is a space in the icon display region 350 of the tab t' (YES in the step S804), the processing proceeds to the step S805, and in the case that the CPU 101 judges that there is no space in the icon display region 350 of the tab t' (NO in the step S804), the processing proceeds to a step S806.

In the step S805, the CPU 101 displays the insertable cursor, which is one example of displaying that the drop operation of the dragging icon is possible (a display indicating that the drop operation is possible), on the heading part of the tab t'. On the other hand, in the step S806, the CPU 101 displays a non-insertable mark, which is one example of displaying that the drop operation of the dragging icon is not possible (a display indicating that the drop operation is not possible), on the heading part of the tab t'. When the processing of the step S805 or the processing of the step S806 is completed, the CPU 101 ends the processing of the step S612. As a result, the processing is returned from the step S612 to the step S610.

Here, display examples in the step S805 and the step S806 will be described. FIG. 9A referred to in the description of the processing of the step S801 also shows a state that the insertable cursor 901 is displayed on the heading part 310 of the tab 2 by the processing of the step S805.

Figure 9B:
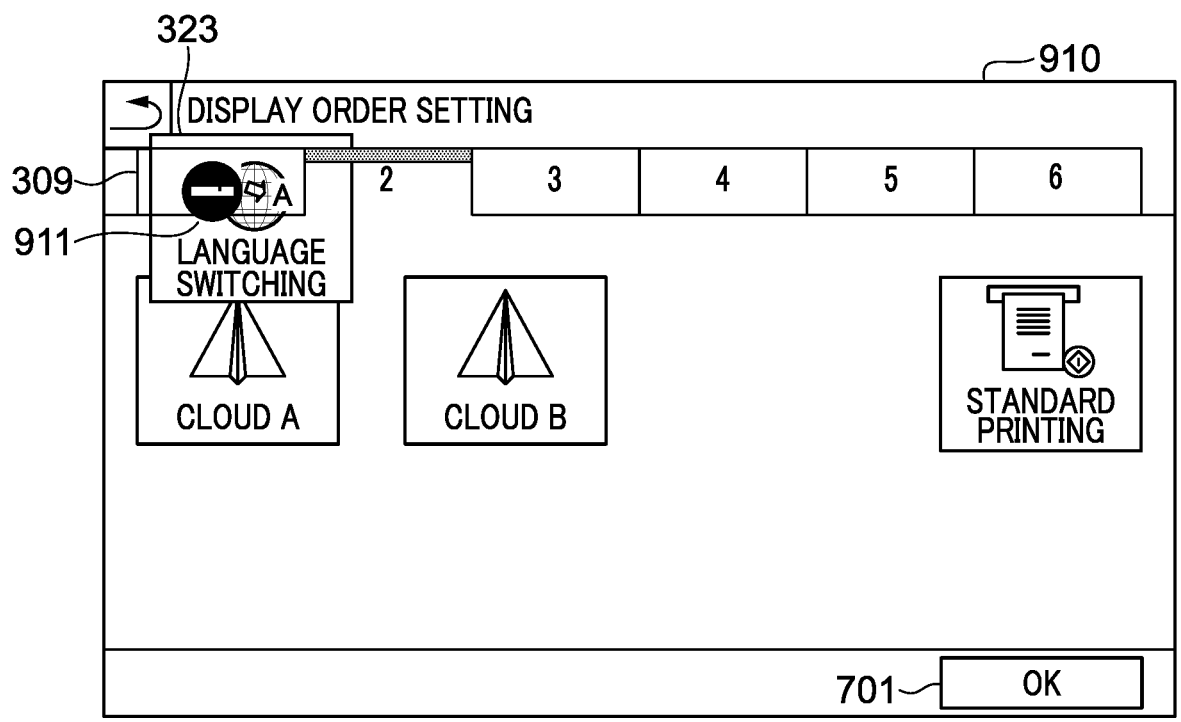

FIG. 9B is a figure that shows one example of a display order setting screen that a non-insertable mark 911 is displayed. A setting screen 910 of FIG. 9B shows a state that after the home screen of FIG. 3B shifts to the display order setting screen, the icon 323 is tapped in and the icon 323 is dragged onto the heading part 309 of the tab 1. On the setting screen 910, since there is no space in the icon display region 350 of tab 1 (eight icons are accommodated), it is not possible to insert the icon, as a result, the non-insertable mark 911 is displayed on the heading part 309 of the tab 1.

Figure 10A:
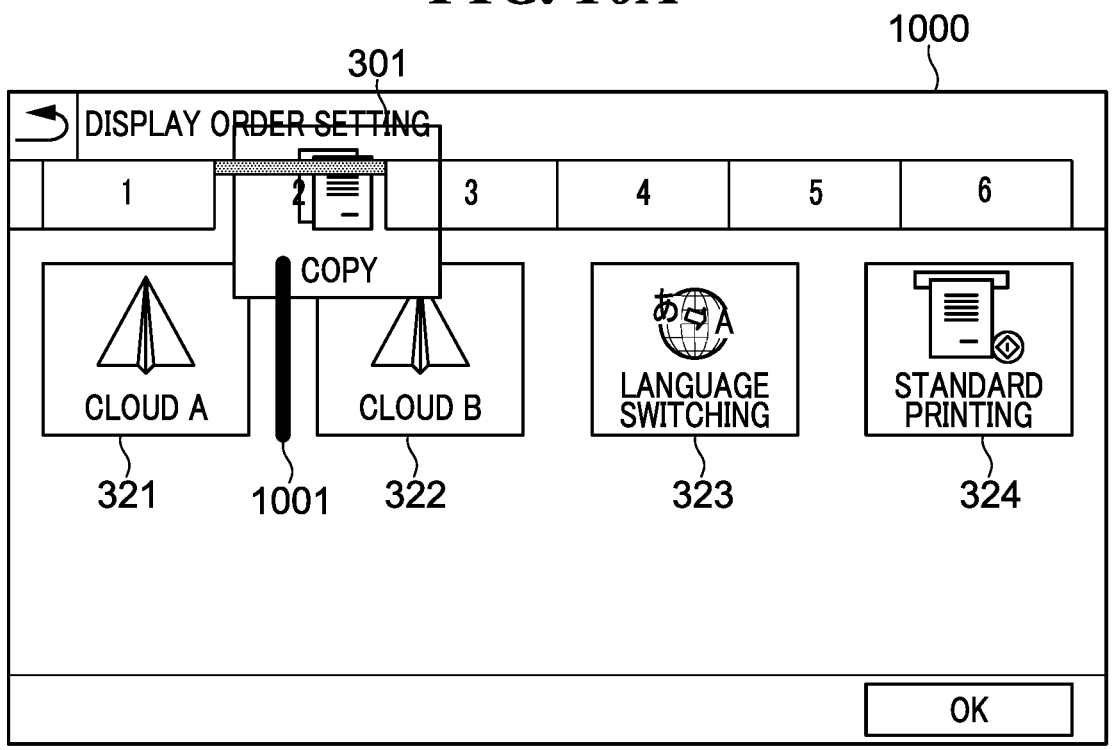
FIG. 10A is a figure that shows one example of the display order setting screen, on which an insertion position cursor is displayed.

In the step S802, in the case that the CPU 101 judges that the position of the dragging icon is within the icon display region 350 (YES in the step S802), the processing proceeds to a step S807. In the step S807, the CPU 101 displays an insertion position cursor that indicates a position where the dragging icon is inserted. FIG. 10A is a figure that shows one example of the display order setting screen, on which the insertion position cursor is displayed. After the setting screen 900 of FIG. 9A is displayed, when a processing of a step S1104 described later is performed, as shown in FIG. 10A, a setting screen 1000, on which the entire tab 2 is displayed, is displayed. Then, an insertion position cursor 1001 is displayed according to the display position of the icon 301. In FIG. 10A, since the icon 301 is dragged between the icon 321 and the icon 322, the insertion position cursor 1001 is displayed between the icon 321 and the icon 322. Further, a processing when the icon 301 is dropped at this position will be described later.

The display position of the insertion position cursor 1001 will be described in more detail. FIG. 10A is a display example of the insertion position cursor 1001 in the case that the center of the icon 301, which is the dragging icon, is located on the right side of the center of the icon 321 and on the left side of the center of the icon 322, and is on the upper part side of the boundary between the upper part and the lower part of the icon display region 350. Further, the upper part and the lower part of the icon display region 350 mean the upper region and the lower region that are formed by dividing the icon display region 350 into two equal parts by a virtual line parallel to the long side in FIG. 10A.

In the case that the center of the dragging icon is located in the blank region of the icon display region 350 (excluding the gap region between the icons displayed adjacent to each other), when i in the array [t] [i] is traced back to the smaller one, the insertion position cursor 1001 is displayed on the right side of the region that is not blank. For example, in the case that two icons are accommodated in the icon display region 350, the insertion position cursor 1001 is displayed on the right side of the region 2 of the upper part of FIG. 4. Further, in the case that the upper part of the icon display region 350 is full and the lower part of the icon display region 350 is empty as in the setting screen 1000 and the center of the dragging icon is located in the lower part of the icon display region 350, the insertion position cursor 1001 is displayed on the left side of the region 5 (the left end of the lower part) of FIG. 4 in place of the right side of the region 4 of FIG. 4. Furthermore, in the case that no icon is accommodated in the icon display region 350 (i.e., in the case that the number of accommodated icons is zero), the insertion position cursor 1001 is displayed on the left side of the region 1 of the upper part of FIG. 4.

Further, in the present embodiment, in the case that four icons are accommodated in the lower part of the icon display region 350, four icons are also accommodated in the upper part of the icon display region 350. In this case, since the icon cannot be inserted into the tab 2, when the icon 301 of the tab 1 is dragged onto the heading part 310 of the tab 2, the processing of the step S806 is performed. That is, the insertion position cursor 1001 will not be displayed on the icon display region 350 of the tab, in which eight icons are accommodated.

Figure 11:
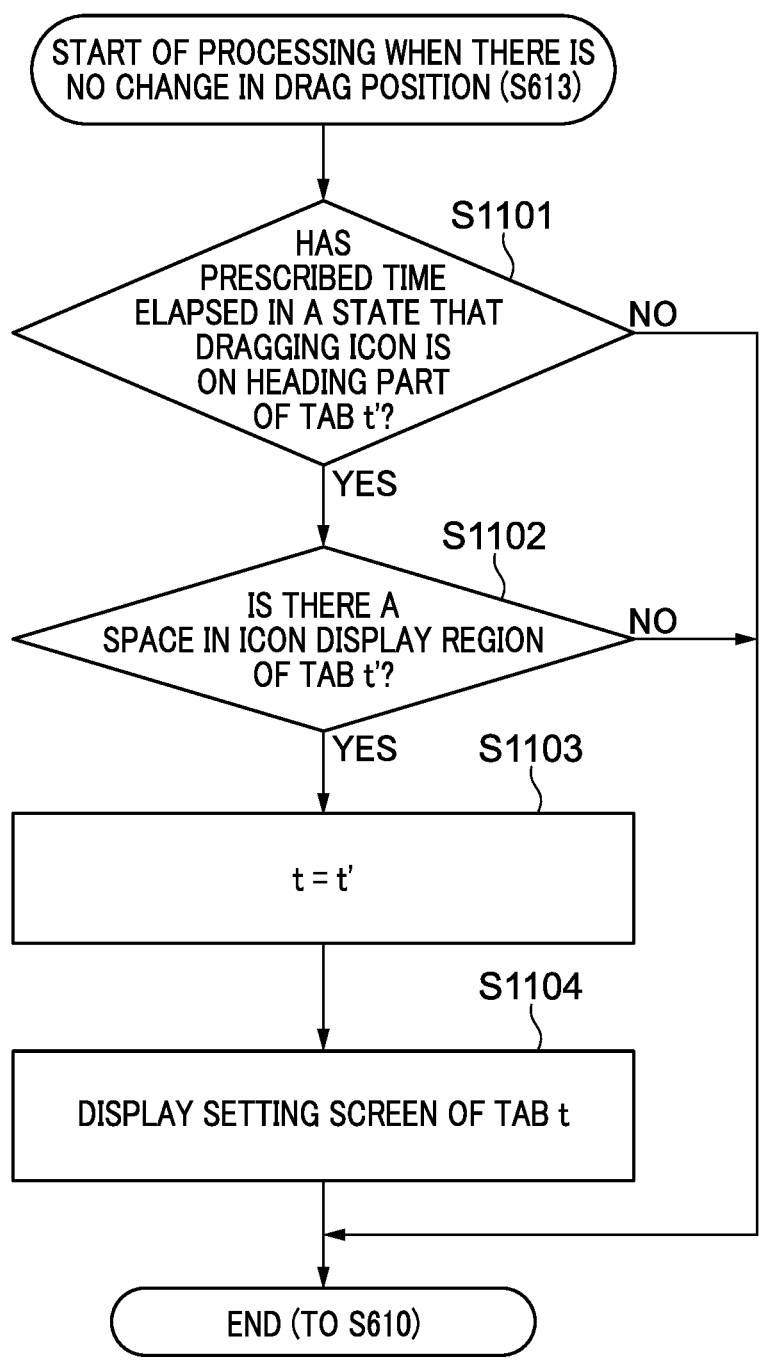
FIG. 11 is a flowchart of a processing of a step S613.

Next, the processing of the step S613 will be described. FIG. 11 is a flowchart of the processing when there is no change in the drag position of the step S613. Each processing, which is indicated by the S number in the flowchart of FIG. 11, is executed by the CPU 101 executing a part of the program constituting the UI unit 202 to control the operation of each unit of the MFP 10.

In a step S1101, the CPU 101 judges whether or not a prescribed time has elapsed in a state that the dragging icon is on the heading part of the tab t' different from the displayed tab t. In the case that the CPU 101 judges that the prescribed time has not elapsed (NO in the step S1101), the CPU 101 ends the processing of the step S613. On the other hand, in the case that the CPU 101 judges that the prescribed time has elapsed (YES in the step S1101), the processing proceeds to a step S1102.

In the step S1102, the CPU 101 judges whether or not there is a space in the icon display region 350 of the tab t'. In the case that the CPU 101 judges that there is no space in the icon display region 350 of the tab t' (NO in the step S1102), the CPU 101 ends the processing of the step S613. On the other hand, in the case that the CPU 101 judges that there is a space in the icon display region 350 of the tab t' (YES in the step S1102), the processing proceeds to a step S1103.

In the step S1103, the CPU 101 replaces t (the tab number) set in the step S602 with t'. Then, as with the step S603, in the step S1104, the CPU 101 displays a display order setting screen of the tab having the newly set tab number t, and then ends the processing of the step S613. As a result, the processing is returned from the step S613 to the step S610.

A specific display example in the step S1104 will be described. For example, it is assumed that the prescribed time has elapsed without changing of the drag position on the setting screen 900 of FIG. 9A, in which the icon 301 is dragged onto the heading part 310 of the tab 2. Then, as shown in the setting screen 1000 of FIG. 10A, the position of the icon 301 does not change, and the display is switched from the content of the tab 1 (an accommodation state of the icons) to the content of the tab 2.

Figure 12:
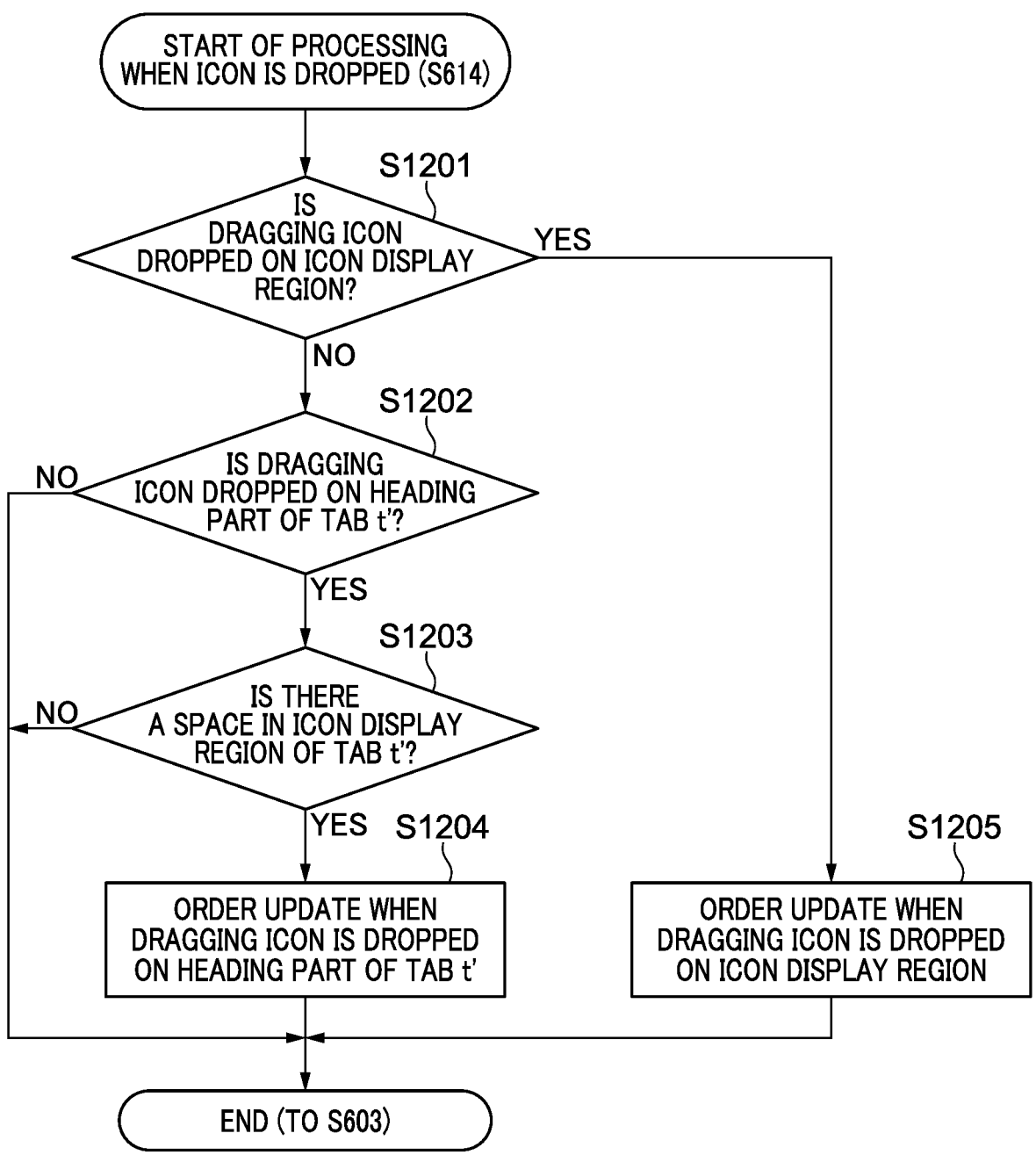
FIG. 12 is a flowchart of a processing of a step S614.

Next, the processing of the step S614 will be described. FIG. 12 is a flowchart of the processing when the icon is dropped of the step S614. Each processing, which is indicated by the S number in the flowchart of FIG. 12, is executed by the CPU 101 executing a part of the program constituting the UI unit 202 to control the operation of each unit of the MFP 10.

In a step S1201, the CPU 101 judges whether or not the dragging icon has been dropped on the icon display region 350. In the case that the CPU 101 judges that the dragging icon has not been dropped on the icon display region 350 (NO in the step S1201), the processing proceeds to a step S1202. In the step S1202, the CPU 101 judges whether or not the dragging icon has been dropped on the heading part of the tab t' different from the displayed tab t. In the case that the CPU 101 judges that the dragging icon has not been dropped on the heading part of the tab t' (NO in the step S1202), the CPU 101 ends the processing of the step S614, and in the case that the CPU 101 judges that the dragging icon has been dropped on the heading part of the tab t' (YES in the step S1202), the processing proceeds to a step S1203.

In the step S1203, the CPU 101 judges whether or not there is a space in the icon display region 350 of the tab t'. In the case that the CPU 101 judges that there is a space in the icon display region 350 of the tab t' (YES in the step S1203), the processing proceeds to a step S1204, and in the case that the CPU 101 judges that there is no space in the icon display region 350 of the tab t' (NO in the step S1203), the CPU 101 ends the processing of the step S614. Further, the case that the judging of the step S1203 is NO, that is, dropping the dragging icon onto the heading part of tab t' with no space in the icon display region 350 is practically ignored. As a result, the dropped icon will be drawn at the original position by the subsequent processing (i.e., the processing of the step S603).

In the step S1204, the CPU 101 performs an order update processing when the dragging icon is dropped on the heading part of the tab t'. For example, as in the setting screen 900 of FIG. 9A, it is assumed that the icon 301 is dropped on the heading part 310 of the tab 2, on which the insertable cursor 901 is displayed. In this case, in the step S1204, the duplicate of the display order array 400 generated internally in the step S601 is operated as follows. That is, at first, '301', which is a value for identifying the icon 301, is written into the array [2] [5], which is the beginning of the blank in the icon display region 350 of the tab 2. Further, the arrays [1] [2] to [1] [8] of the tab 1 are moved to (rewritten into) the arrays [1] [1] to [1] [7]. Finally, '0' indicating a blank is written into the array [1] [8] of the tab 1. The processing of the step S1204 ends the processing of the step S614, as a result, the processing is returned to the step S603.

Figure 13:
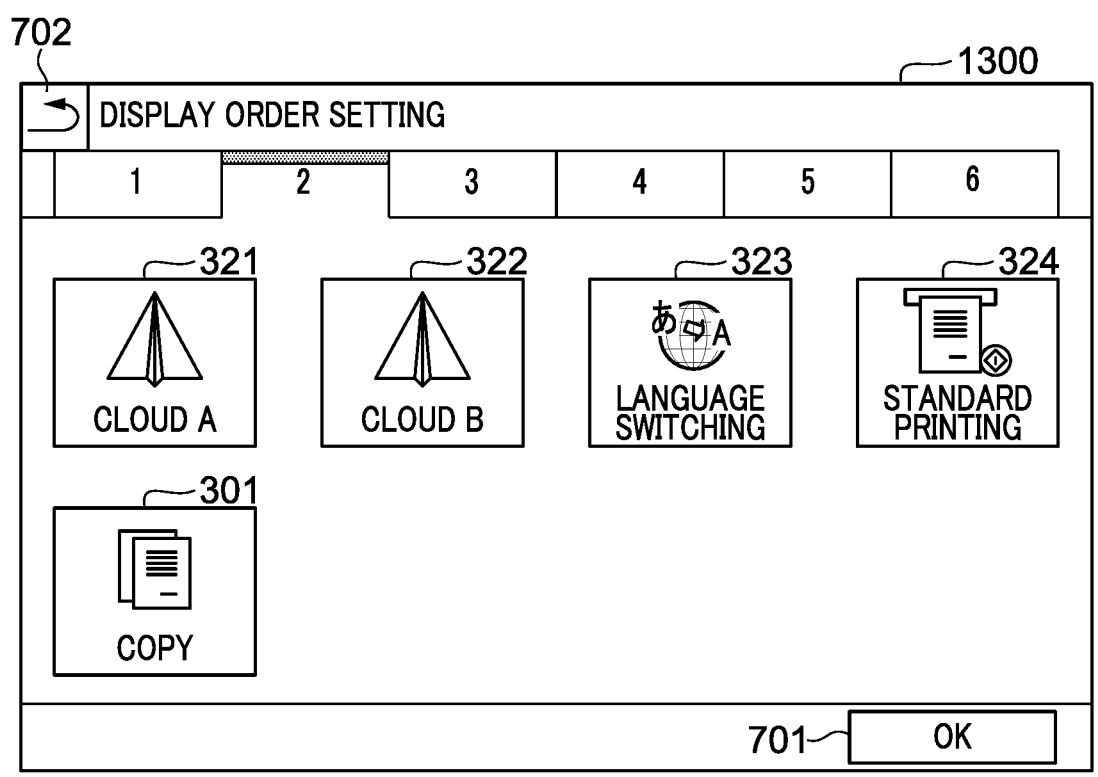
FIG. 13 is a figure that shows one example of the display order setting screen after a processing of a step S1204.

FIG. 13 is a figure that shows a display order setting screen 1300 of the tab 2 displayed in the step S603 according to the duplicate of the display order array updated by the above processing example. From the setting screen 1300, it is clear that the icon 301 is inserted and displayed at the end of the icon display region 350 of the tab 2.

Figure 14A:
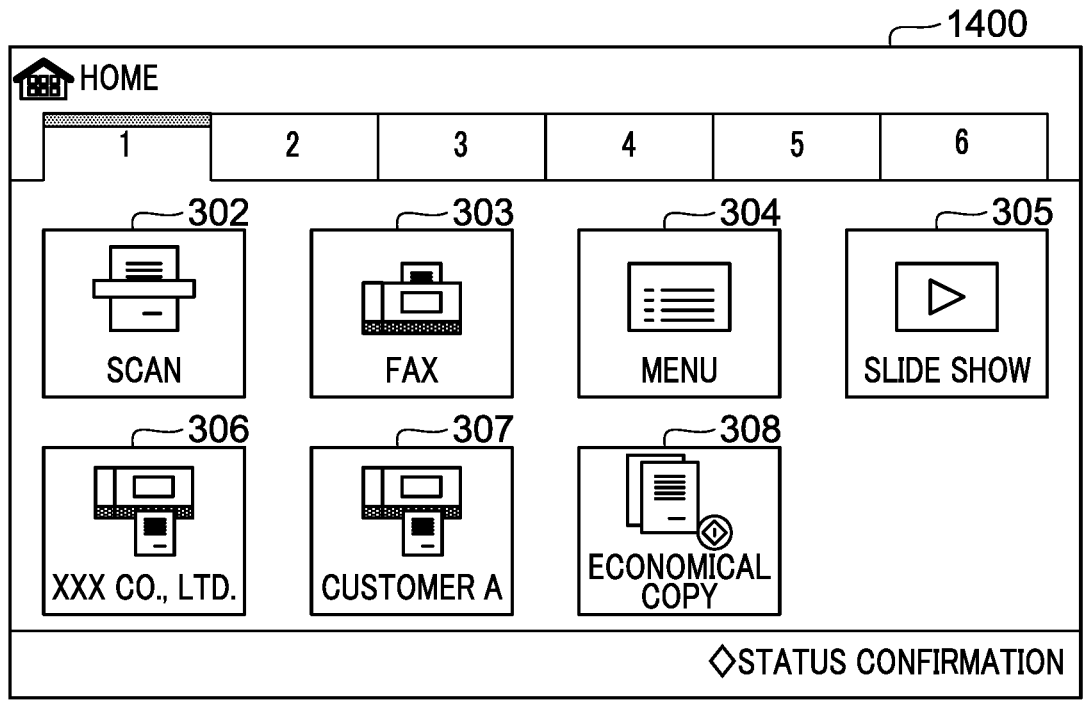
FIGS. 14A and 14B are figures that show one example of the home screen displayed after an OK button is pressed on the display order setting screen.
Figure 14B:
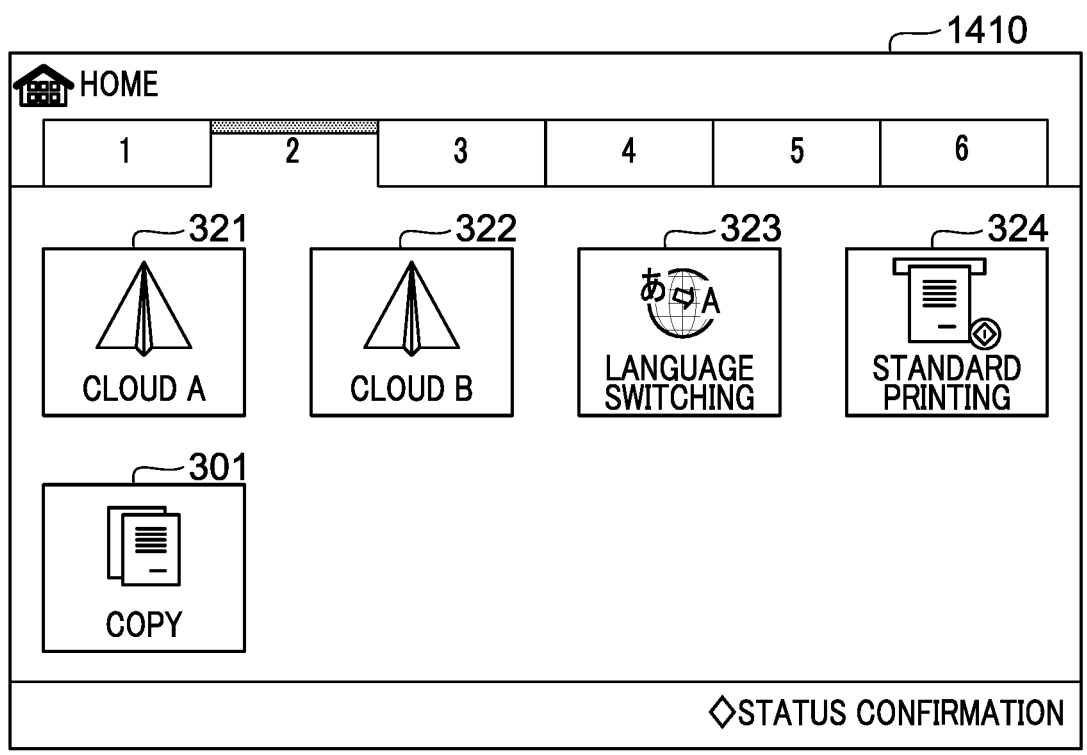

FIGS. 14A and 14B are figures that show one example of the home screen displayed after the OK button 701 is pressed on the setting screen 1300. FIG. 14A shows a home screen 1400 in the case that the tab 1 is selected, and FIG. 14B shows a home screen 1410 in the case that the tab 2 is selected. By comparing the home screen 300 of FIG. 3A and the home screen 1400 of FIG. 14A, it is clear that on the home screen 1400, the icons 302 to 308 have moved to the previous region, and a blank has been generated at the end. Further, by comparing the home screen 320 of FIG. 3B and the home screen 1410 of FIG. 14B, it is clear that on the home screen 1410, the icon 301 is arranged at the left end of the lower part of the icon display region 350. Furthermore, in the case that the back button 702 is pressed on the setting screen 1300, even if the duplicate of the display order array has been updated, since the processing of the step S606 will not be performed, the display order array 400 remains as it is before updating. As a result, the content of the tab 1 and the content of the tab 2 return to the state of the home screen 300 and the state of the home screen 320, respectively.

In the step S1201, in the case that the CPU 101 judges that the dragging icon has been dropped on the icon display region 350 (YES in the step S1201), the processing proceeds to a step S1205. In the step S1205, the CPU 101 updates the order of the icons in the icon display region 350, on which the icon is dropped. A specific display example in the step S1205 will be described with reference to the setting screen 1000 of FIG. 10A shown above. The setting screen 1000 shows a state that after the icon 301 of the tab 1 is dragged on the heading part 310 of the tab 2, the display content is switched from the tab 1 to the tab 2 after the prescribed time has elapsed, and further the insertion position cursor 1001 is displayed between the icon 321 and the icon 322. When the icon 301 is dropped in this state, in the step S1205, the duplicate of the display order array 400 generated internally in the step S601 is operated as follows. That is, at first, the contents of the arrays [2] [2] to [2] [4] that position numbers of the icons are behind the insertion position cursor 1001 and immediately before the blank are moved to the arrays [2] [3] to [2] [5]. Then, '301', which is the value for identifying the icon 301, is written into the blank array [2] [2].

Figure 10B:
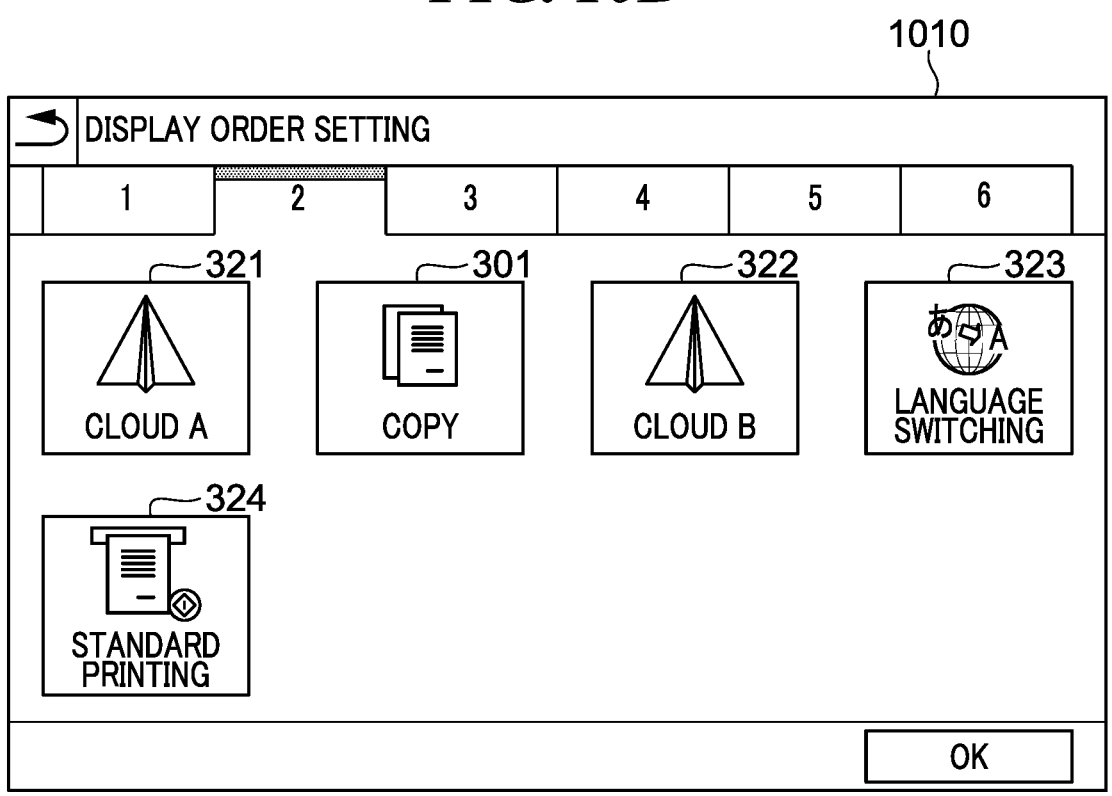
FIG. 10B is a figure that shows one example of the display order setting screen after the icon is dropped.

FIG. 10B is a figure that shows a display order setting screen 1010 of the tab 2 displayed in the step S603 according to the duplicate of the display order array updated by the above processing example. From the setting screen 1010, it is clear that in the icon display region 350 of the tab 2, the icon 301 is arranged and displayed on the region 2 of FIG. 4. The processing of the step S1205 ends the processing of the step S614, as a result, the processing is returned to the step S603.

As described above, according to the display control in the first embodiment, it is possible for the user to easily move the icon across the tabs, and moreover, it is possible for the user to freely change the order of the icon in the tab of the movement destination by dropping the dragging icon at an arbitrary position on the tab of the movement destination. Also, when an icon is dragged onto a tab that does not have a space for inserting the icon, a mark indicating that the icon cannot be dropped onto that tab is displayed on the heading part of the tab. In this case, even in the case that the icon stays on the heading part of the tab for a certain period of time, the display of the tab will not be switched, so that the user does not have to perform unnecessary operations.

Next, a second embodiment will be described. In the first embodiment, a method of moving (rearranging) the icon across the tabs has been described by exemplifying the home screen having the six tabs. However, the number of the tabs on the home screen does not have to be six, and an arbitrary number of the tabs may be managed within the range allowed by the database unit 213. Therefore, in the second embodiment, a configuration that a plurality of tabs is scrolled and displayed will be taken up. Further, the descriptions of configuration elements common to the first embodiment will be simplified or omitted, and configuration elements peculiar to the second embodiment will be mainly described below.

Figure 15A:
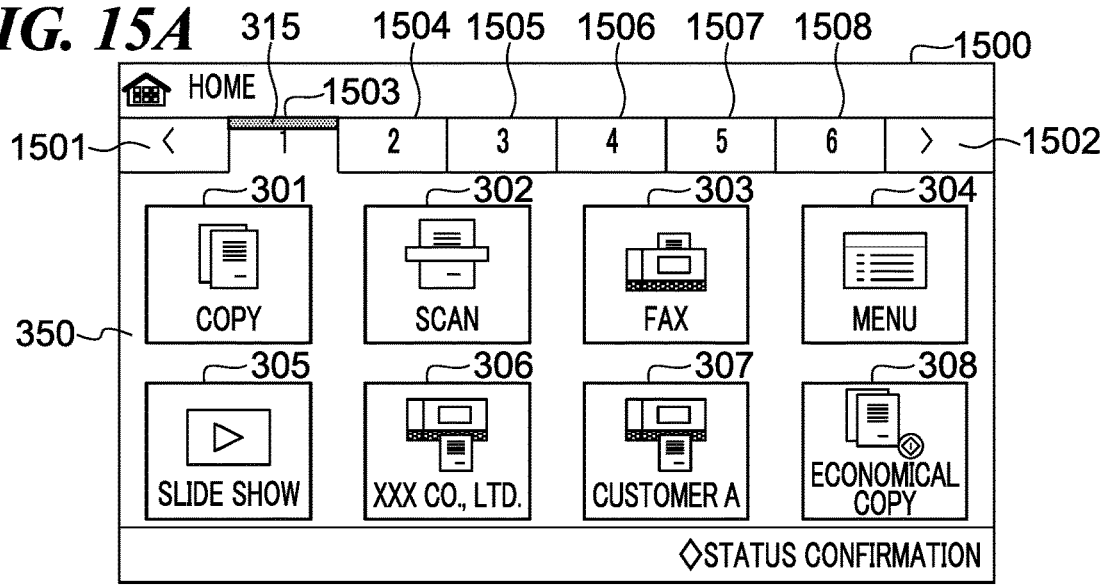
FIGS. 15A, 15B and 15C are figures that show one example of a home screen according to a second embodiment of the MFP.
Figure 15B:
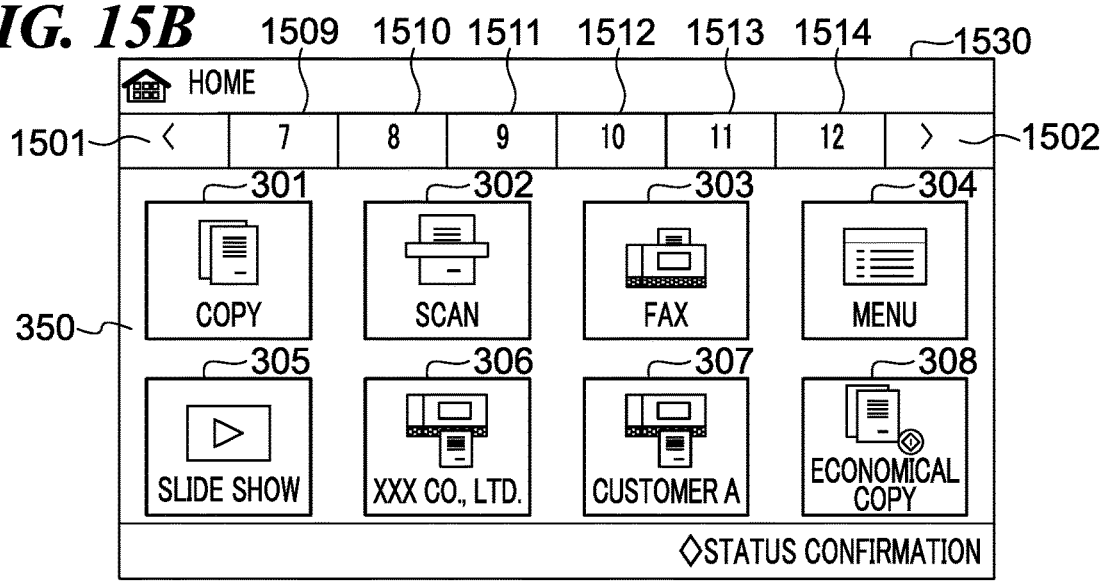
Figure 15C:
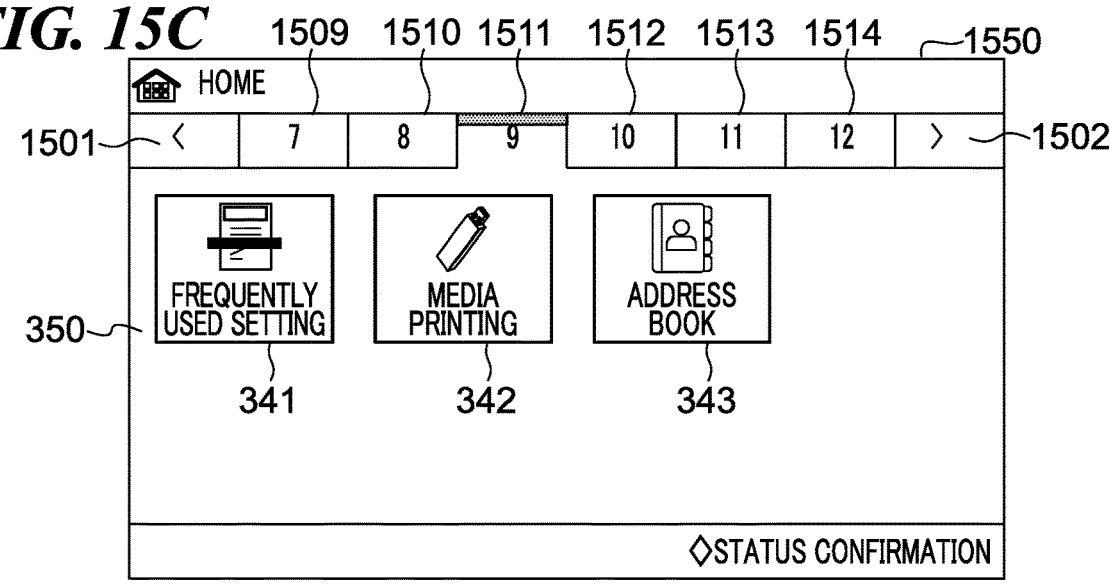

FIGS. 15A, 15B and 15C are figures that show one example of a home screen according to the second embodiment of the MFP 10. The home screen is generated by the CPU 101 executing the program constituting the UI unit 202, and is displayed on the display unit 105 via the UI device controller unit 211. Tabs 1 to 12 can be displayed on the home screen of the second embodiment, and the tabs 1 to 12 have heading parts 1503 to 1514.

More specifically, a home screen 1500 of FIG. 15A shows a state that the tab 1 is selected and the icons 301 to 308 accommodated in the tab 1 are displayed. When the number of heading parts of the tabs displayed on the home screen is increased, a display area of the tab is inevitably reduced and a touch operability is deteriorated. In order to prevent such a problem, the number of tabs displayed on the home screen is set to six. Further, the number of tabs that can be displayed can be arbitrarily set as long as the touch operability does not deteriorate, and is not limited to six that is set in the present embodiment.

On the other hand, in order to select a tab that is not displayed and display the icon display region of the selected tab, a tab scroll bar 1501 and a tab scroll bar 1502 are displayed at the left and right ends of the region, on which the heading part of the tab is displayed, respectively. The tab scroll bar 1501 and the tab scroll bar 1502 are displayed in the case that the number of tabs provided exceeds the number of tabs that can be displayed at the same time, and therefore are not displayed on the home screen of the first embodiment. By selecting the tab scroll bar 1502 on the home screen 1500, the tabs 7 to 12, which are not displayed on the home screen 1500, can be displayed.

A home screen 1530 of FIG. 15B shows a state that the heading parts of the tabs 7 to 12 are displayed by a touch operation on the tab scroll bar 1502. On the home screen 1530, the scrolling of the heading part of the tab is finished, and no specific tab is selected. Therefore, the icons 301 to 308 of the tab 1 on the original home screen 1500 are still displayed on the icon display region 350.

A home screen 1550 of FIG. 15C shows a state that the icons 341 to 343 accommodated in the tab 9 are displayed on the icon display region 350 by performing a touch operation on the tab 9 (selecting the tab 9) on the home screen 1530. As with the first embodiment, in order to inform the user that which tab is displayed, the tab selection mark 315 is added to the heading part of the displayed tab.

Figure 16:
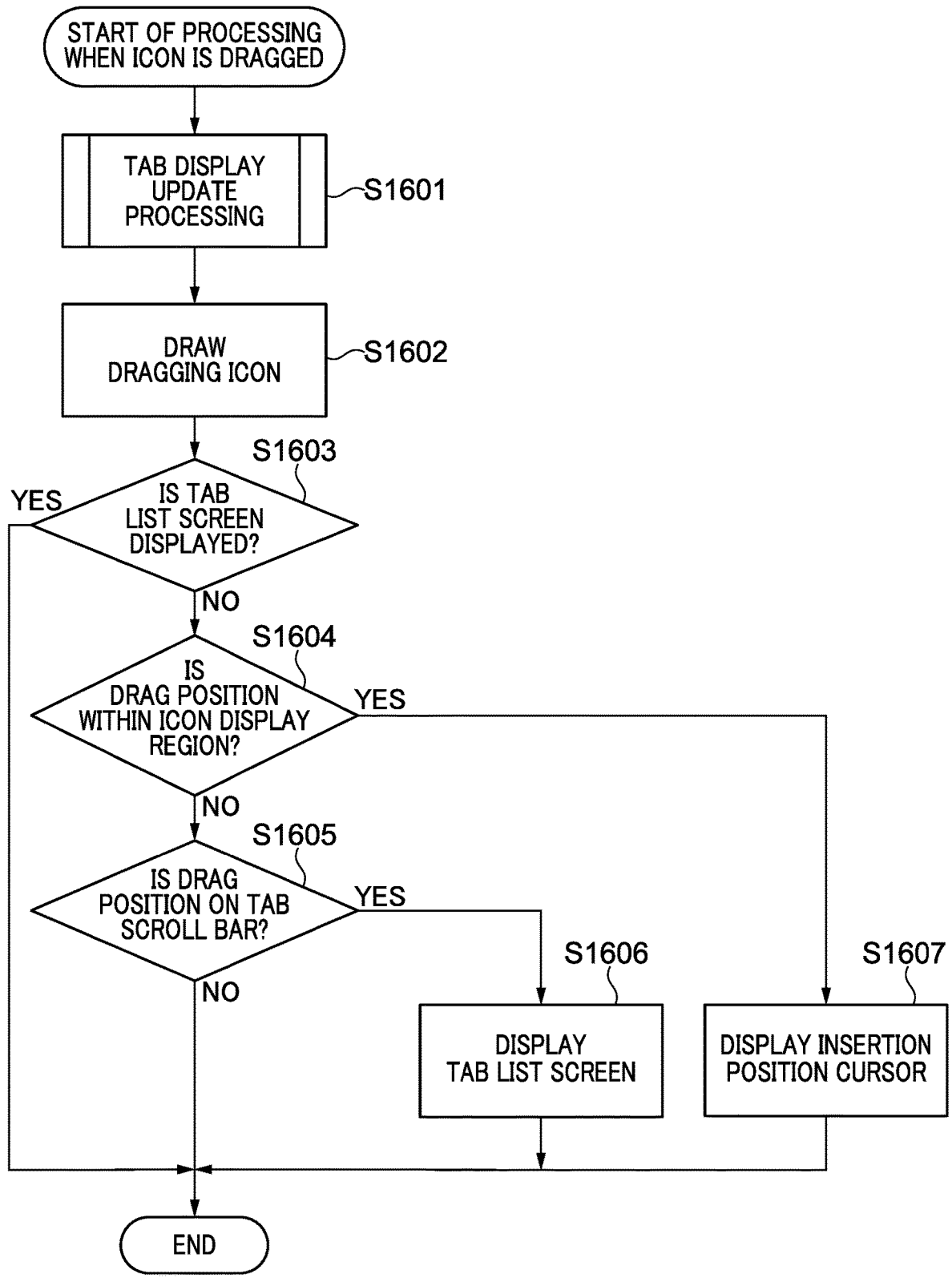
FIG. 16 is a flowchart of a processing when the icon is dragged in the second embodiment corresponding to the step S612 in the first embodiment.

FIG. 16 is a flowchart of a processing when the icon is dragged in the second embodiment corresponding to the step S612 (the processing when the icon is dragged) in the first embodiment. Further, the processing of the steps S601 to S611, S613, and S614 in the first embodiment is applied to the second embodiment as it is. Each processing, which is indicated by the S number in the flowchart of FIG. 16, is executed by the CPU 101 executing a part of the program constituting the UI unit 202.

In a step S1601, the CPU 101 performs a tab display update processing. Further, the details of the tab display update processing of the step S1601 will be described later with reference to FIG. 19. In a step S1602, the CPU 101 draws the dragging icon. As with the processing of the step S801 in the first embodiment, in the processing of the step S1602, the image of the dragging icon at the previous drawing position is erased with the background image, and the same icon image is drawn at the new position. Further, specifically, the display example is the same as the display mode of the dragging icon on the setting screen 900 of FIG. 9A.

Figure 17A:
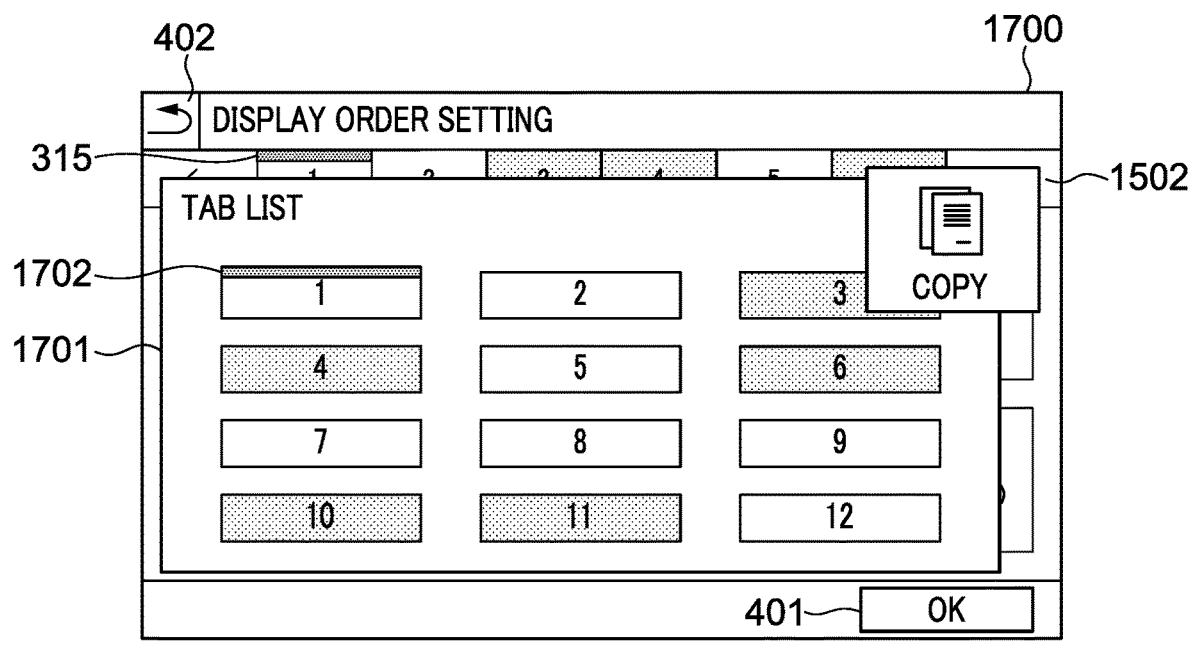
FIG. 17A is a figure that shows one example of a tab list screen.

In a step S1603, the CPU 101 judges whether or not a tab list screen is displayed. FIG. 17A is a figure that shows one example of a tab list screen 1701. The tab list screen 1701 shows a state after a processing of a step S1606, which will be described later, is completed.

The tab list screen 1701 is displayed so as to be superimposed on a screen 1700. Frames 1 to 12 in the tab list screen 1701 correspond to the tabs 1 to 12 (the heading parts 1503 to 1514). Further, in order to inform the user that the currently selected tab is the tab 1, a mark 1702 corresponding to the tab selection mark 315 is displayed in the vicinity of the upper side of the frame 1. In order to indicate that the corresponding tabs 3, 6, 10 and 11 do not have a space for inserting an icon in its icon display region 350, the backgrounds of the frames 3, 6, 10 and 11 are represented by a dark color (i.e., a non-insertable color, which will be described later).

In the case that the CPU 101 judges that the tab list screen 1701 is displayed (YES in the step S1603), the CPU 101 ends the processing, and in the case that the CPU 101 judges that the tab list screen 1701 is not displayed (NO in the step S1603), the processing proceeds to a step S1604.

In the step S1604, the CPU 101 judges whether or not the icon is dragged on the icon display region 350. In the case that the CPU 101 judges that the icon is not dragged onto the icon display region 350 (NO in the step S1604), the processing proceeds to a step S1605. In the step S1605, the CPU 101 judges whether or not the icon is dragged onto any one of the tab scroll bar 1501 and the tab scroll bar 1502. In the case that the CPU 101 judges that none of the tab scroll bar 1501 and the tab scroll bar 1502 is dragged (NO in the step S1605), the CPU 101 ends the processing. In this case, substantially no processing is performed after the processing of the step S1602 is completed. On the other hand, in the case that the CPU 101 judges that the icon is dragged onto any one of the tab scroll bar 1501 and the tab scroll bar 1502 (YES in the step S1605), the processing proceeds to the step S1606.

In the step S1606, the CPU 101 displays the tab list screen, and then ends the processing. Further, the example of the tab list screen has been described previously with reference to FIG. 17A.

In the step S1604, in the case that the CPU 101 judges that the icon is dragged onto the icon display region 350 (YES in the step S1604), the processing proceeds to a step S1607. In the step S1607, the CPU 101 displays the insertion position cursor that indicates the position where the dragging icon is inserted, and then ends the processing. Further, a specific display example of the insertion position cursor is the same as the display mode of the insertion position cursor 1001 on the setting screen 1000 of FIG. 10A.

Figure 18:
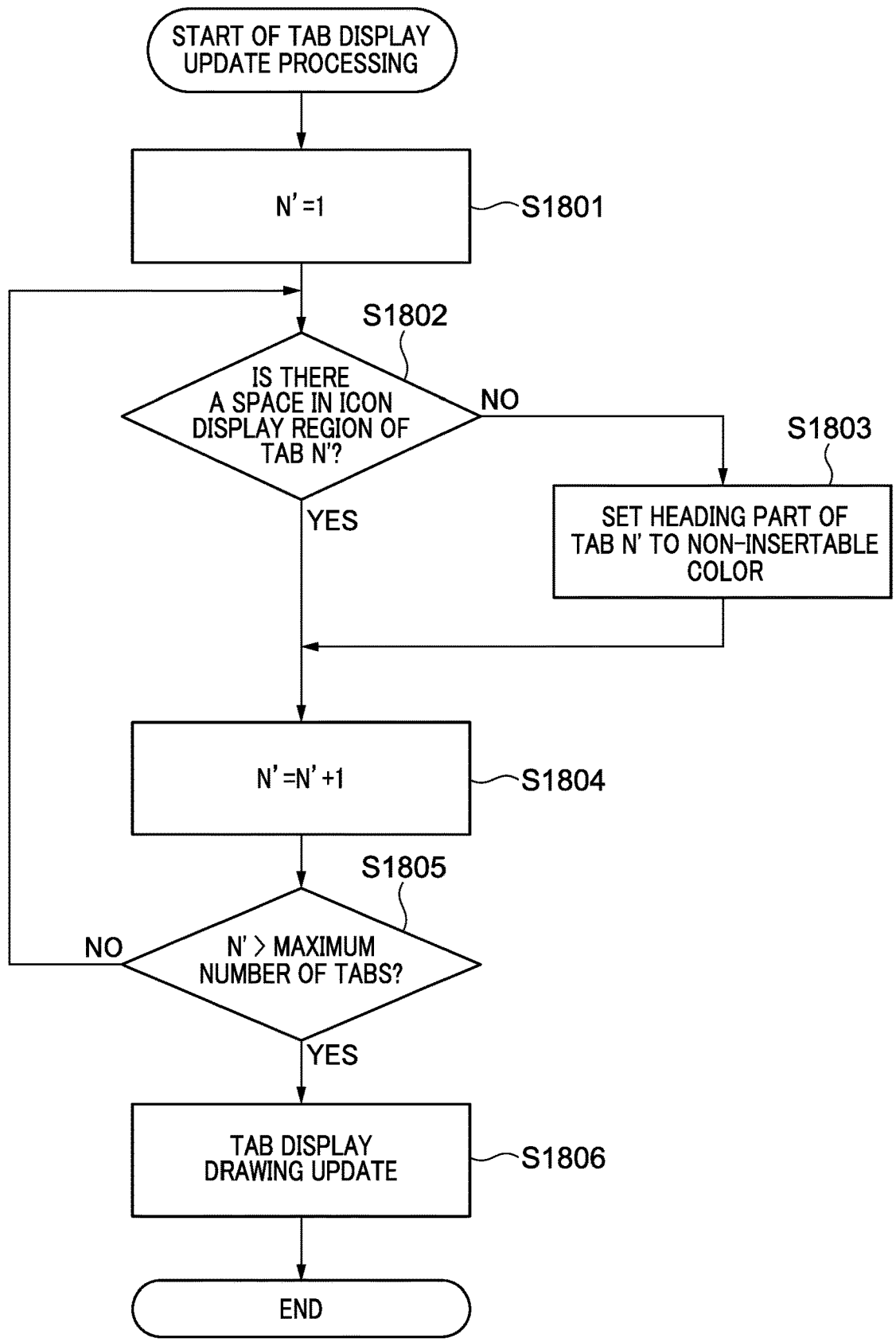
FIG. 18 is a flowchart of a processing of a step S1601.

FIG. 18 is a flowchart of the tab display update processing of the step S1601. Each processing, which is indicated by the S number in the flowchart of FIG. 18, is executed by the CPU 101 executing a part of the program constituting the UI unit 202. In a step S1801, the CPU 101 sets the value of a tab N' to '1'. N'=1 indicates the tab 1 (the heading part 1503) on the home screen 1500.

In a step S1802, the CPU 101 judges whether or not there is a space in the icon display region 350 of the tab N'. In the case that the CPU 101 judges that there is a space in the icon display region 350 of the tab N' (YES in the step S1802), the processing proceeds to a step S1804, and in the case that the CPU 101 judges that there is no space in the icon display region 350 of the tab N' (NO in the step S1802), the processing proceeds to a step S1803. In the step S1803, since there is no space in the icon display region 350 of the tab N', the CPU 101 sets the non-insertable color, which indicates that the icon cannot be dropped, in the heading part of the tab N', and then, the processing proceeds to the step S1804.

In the step S1804, the CPU 101 increases the value of N' just by 1 as an increment. In a step S1805, the CPU 101 judges whether or not N' is larger than the maximum number of tabs. In the second embodiment, since there are the tabs 1 to 12, the maximum number of tabs is '12'. In the case that the CPU 101 judges that N' is larger than the maximum number of tabs, that is, in the case that a confirmation of whether or not there are spaces in all of the tabs 1 to 12 has been completed (YES in the step S1805), the processing proceeds to a step S1806. On the other hand, in the case that the CPU 101 judges that N' is equal to or less than the maximum number of tabs, that is, in the case that the confirmation of whether or not there are spaces in all of the tabs 1 to 12 has not been completed (NO in the step S1805), the processing returns to the step S1802.

Figure 17B:
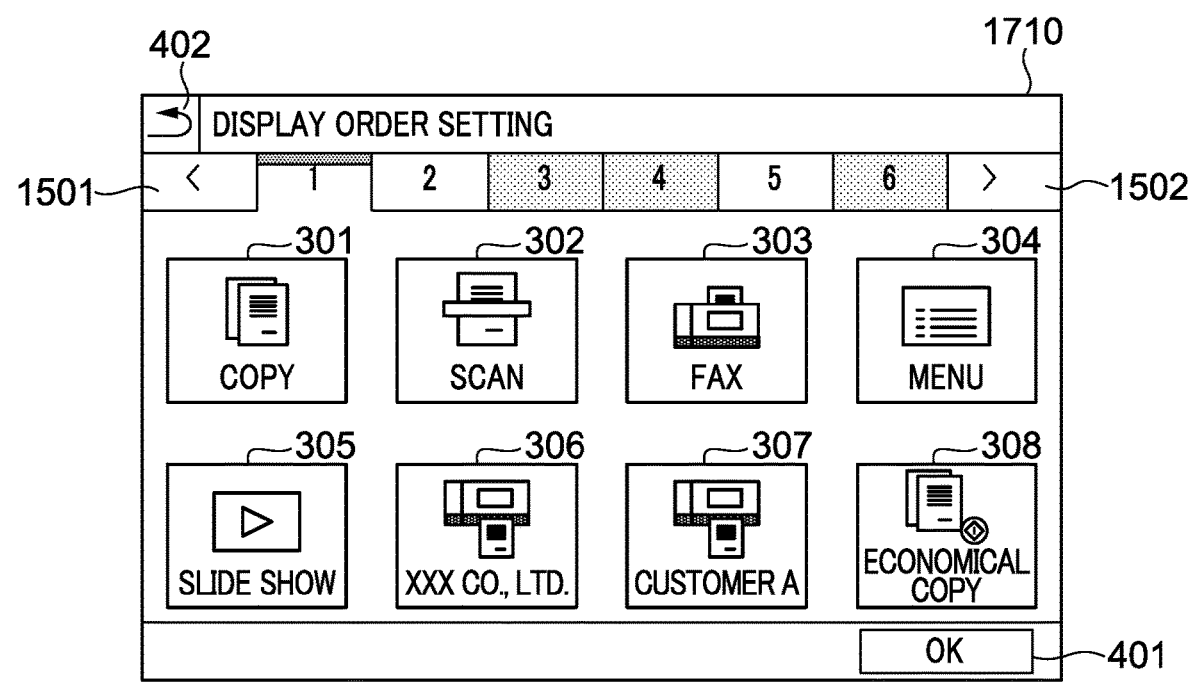
FIG. 17B is a figure that shows one example of a screen that tab display drawing update is performed.

In the step S1806, the CPU 101 performs a tab display drawing update, and then ends the tab display update processing. A screen 1710 shown in FIG. 17B is one example of a screen that the tab display drawing update is performed in the step S1806. On the screen 1710, the heading part of the tab having no space in its icon display region 350 is represented by the non-insertable color (a gray color in FIG. 17B). Further, on the tab list screen 1701 generated in the step S1606, after the processing of the step S1806 is performed, as shown in FIG. 17A, the frame corresponding to the tab that its heading part is represented by the non-insertable color is also represented by the non-insertable color.

Figure 19:
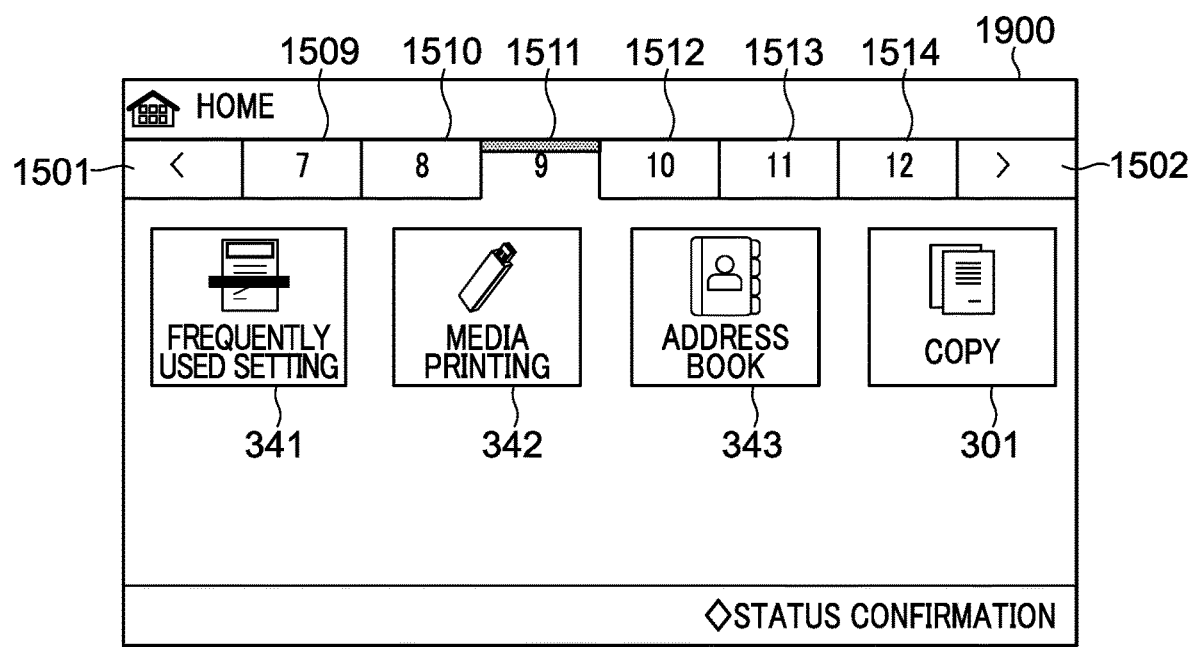
FIG. 19 is a figure that shows one example of a screen after an icon is moved by display control in the second embodiment.

A screen 1900 shown in FIG. 19 is one example of a screen after the icon is moved by the display control in the second embodiment. The screen 1900 is a home screen that is displayed as a time-dependent result, which is obtained by dragging the icon 301 of the tab 1, dropping it on the frame 9 of FIG. 17A corresponding to the tab 9, and then pressing the OK button (a touch operation on the OK button is performed).

As described above, according to the display control in the second embodiment, even in the case that there are more tabs on the home screen than the number of tabs that can be displayed simultaneously on the display unit 105, it is possible for the user to easily move the icon across the tabs. Further, in that case, it is possible for the user to freely change the order of the icon in the tab of the movement destination by dropping the dragging icon at an arbitrary position on the tab of the movement destination. Furthermore, a tab that does not have a space for inserting an icon is displayed in a way that is distinguishable from a tab that has a space for inserting an icon. This makes it difficult to drag and drop onto the tab that does not have a space for inserting an icon, and the user does not have to perform unnecessary operations.

Although the present invention has been described in detail based on the preferred embodiments thereof, the present invention is not limited to these specific embodiments, and various embodiments within the scope of the gist of the present invention are also included in the present invention. Further, each of the above-described embodiments shows only one embodiment of the present invention, and each embodiment can be combined as appropriate.

For example, in the above embodiment, although the configuration capable of accommodating eight icons in one tab is adopted, the number of icons that can be accommodated in one tab is not limited to eight. For example, in the case that the screen of the display unit (the screen of the LCD or the like) is physically small, the number of icons that can be accommodated in one tab may be about four, and conversely, in the case that the screen of the display unit is physically large, the number of icons that can be accommodated in one tab may be more than eight. Further, even in the case that the screen of the display unit is small, one tab may accommodate more than eight icons by reducing the size of the icons.

In the above embodiment, in the case that there is a space that can accommodate a plurality of icons when the dragging icon is dropped on the heading part of the tab, the configuration that the dragging icon is inserted at the beginning of the space is adopted. However, the present invention is not limited to this configuration, and for example, a configuration, which sets the insertion position of the icon at the beginning of the icon display region 350 so that the originally accommodated icons move toward the end, may be adopted.

Further, in the above embodiment, although the configuration that in the icon display region 350 of each tab, a space, in which an icon can be inserted, is not provided between adjacent icons, is adopted, the present invention is not limited to this configuration, a configuration that a space is provided between the adjacent icons and the icon can be inserted, may be adopted. Even in that case, the judging of the presence or absence of the space in the icon display region 350 (the processing of the step S804, the processing of the step S1102, the processing of the step S1203, the processing of the step S1802) can be applied as it is.

Furthermore, in the above embodiment, although the screen is configured to shift from the home screen to the display order setting screen when a long tap operation on the icon is performed on the home screen, the screen shifting method is not limited to this. For example, the icon 304 of the home screen 300 of FIG. 3A is pressed (the usual tap operation on the icon 304 of the home screen 300 of FIG. 3A is performed) to shift to a menu screen used for making various settings. Then, an icon for shifting to the display order setting screen is prepared in advance on the menu screen, and a configuration capable of shifting from the home screen to the display order setting screen by pressing that icon may be adopted.

In the first embodiment, in the case that there is no space in the icon display region 350 of the tab, although the method that the non-insertable mark 911 is displayed in the step S806 is adopted, the method, which indicates that the dragging icon cannot be inserted, is not limited to this method. For example, in the case that an icon is dragged onto the heading part of a tab that has no space in its icon display region 350, by performing an animation display that shakes the heading part of that tab up, down, left, and right, it may appear that the insertion of the icon is refused. Further, the fact that the icon cannot be inserted may be expressed by not changing the display of the heading part of the tab at all, or a message indicating "cannot be inserted (non-insertable)" may be temporarily displayed in a pop-up.

Further, in the first embodiment, in the case that there is a space in the icon display region 350 of the tab, although the method that the insertable cursor 901 is displayed in the step S805 is adopted, the method, which indicates that the dragging icon can be inserted, is not limited to this method. For example, the heading part of the tab that is a candidate for inserting the icon may be switched to a highlight color different from the heading parts of other tabs, or a mark, which has a different color and has the same shape as the tab selection mark 315, may be added to the heading part of the tab that is the candidate for inserting the icon. Further, by performing an animation display, in which the dragging icon is gradually reduced, to make the icon appear to be sucked, it may be indicated that the dragging icon can be inserted.

Furthermore, in the first embodiment, the screen is configured to immediately shift from the home screen to the display order setting screen (from the step S501 to the step S502) when a long tap operation on the icon is performed on the home screen. Instead of this, a configuration that a message asking whether or not to shift to the display order setting screen is displayed in a pop-up, and the screen is set to shift to the display order setting screen only when the user's consent is obtained, may be adopted.

In the second embodiment, although the configuration that the tab list screen 1701 is displayed when the icon is dragged onto the tab scroll bar 1501 or the tab scroll bar 1502 is adopted, instead of displaying the tab list screen 1701, the tab may be displayed by scrolling while the icon is being dragged. Then, the display may be switched to the icon display region 350 of the selected tab in synchronization with the scrolling of the tab. On the other hand, in the case that the tab list screen 1701 is displayed, as an operation being a trigger to display the tab list screen 1701, a long tap operation on the tab scroll bar 1501 or the tab scroll bar 1502 on the home screen may be adopted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium.

The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-190219, filed Nov. 16, 2020, which is hereby incorporated by reference herein in its entirety.

What is claimed is:

1. A display device comprising:
   a display unit; and
   a controller configured to:
   cause the display unit to display a screen including a plurality of tabs, wherein each tab includes a tab label area and a tab pane which is capable of accommodating a predetermined number of icons;
   receive a first user instruction for selecting an icon which is to be moved;
   cause, based on the first user instruction, the display unit to display, in a first manner, a tab label area of a first tab in which a number of icons accommodated is less than the predetermined number and to display, in a second manner which is visually distinctive from the first manner, a tab label area of a second tab in which a number of icons accommodated is at least the predetermined number, wherein the first tab and the second tab are included in the plurality of tabs and do not accommodate the icon selected by the first user instruction; and
   receive a second user instruction for designating one of the plurality of tabs as a destination of the selected icon, wherein the first tab is able to be selected by the second user instruction and the second tab is not able to be selected by the second user instruction.

2. The display device according to claim 1,
   wherein the controller causes the display unit to display, in the first manner, the tab label area of the first tab in a first color and the controller causes the display unit to display, in the second manner, the tab label area of the second tab in a second color.

3. The display device according to claim 1,
wherein the controller causes the display unit to display, in the second manner, a predetermined pattern over the tab label area of the second tab.

4. The display device according to claim 1,
wherein the first user instruction is a drag operation and the second user instruction is a drop operating corresponding to the drag operation.

5. The display device according to claim 4,
wherein in a case that a prescribed time has elapsed after the drag operation is performed onto the tab label area of the first tab, the controller causes the display unit to display icons accommodated in the first tab.

6. The display device according to claim 1,
wherein the controller causes the display unit to display, in the second manner, the tab label area of the second tab in a gray-out state.

7. The display device according to claim 1, wherein the first manner indicates that the first tab is able to be selected as the destination of the selected icon.

8. The display device according to claim 7, wherein the second manner indicates that the second tab is not able to be selected as the destination of the selected icon.

9. The display device according to claim 1, wherein the controller causes the display unit to display the first tab in the first manner and the second tab in the second manner even if the first tab and the second tab are not selected based on the first user instruction.

10. The display device according to claim 1, wherein the selected icon is an icon of a copy function.

11. A display device comprising:
a display unit; and
a controller configured to:
cause the display unit to display a screen including a plurality of tabs, wherein each tab includes a tab label area and a tab pane which accommodates one or more icons;
receive a first user instruction for selecting an icon which is to be moved;
cause, based on the first user instruction, the display unit to display, in a first manner, a tab label area of a first tab which has a space for accommodating the selected icon and to display, in a second manner which is visually distinctive from the first manner, a tab label area of a second tab which has no space for accommodating the selected icon, wherein the first tab and the second tab are included in the plurality of tabs and do not accommodate the icon selected by the first user instruction; and
receive a second user instruction for designating one of the plurality of tabs as a destination of the selected icon, wherein the first tab is able to be selected by the second user instruction and the second tab is not able to be selected by the second user instruction.

12. A control method for a display device,
the control method comprising:
causing the display unit to display a screen including a plurality of tabs, wherein each tab includes a tab label area and a tab pane which is capable of accommodating a predetermined number of icons;
receiving a first user instruction for selecting an icon which is to be moved;
causing, based on the first user instruction, the display unit to display, in a first manner, a tab label area of a first tab in which a number of icons accommodated is less than the predetermined number and to display, in a second manner which is visually distinctive from the first manner, a tab label area of a second tab in which a number of icons accommodated is at least the predetermined number, wherein the first tab and the second tab are included in the displayed plurality of tabs; and
receiving a second user instruction for designating one of the plurality of tabs as a destination of the selected icon, wherein the first tab is able to be selected by the second user instruction and the second tab is not able to be selected by the second user instruction.

* * * * *